(12) United States Patent
Book et al.

(10) Patent No.: US 7,894,592 B2
(45) Date of Patent: Feb. 22, 2011

(54) AUTOMATED OPERATOR ASSISTANCE WITH MENU OPTIONS

(75) Inventors: Nancy Ann Book, Naperville, IL (US); Carol Shifrin Gruchala, Naperville, IL (US); Thomas Joseph McBlain, Arlington Heights, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1701 days.

(21) Appl. No.: 11/115,288

(22) Filed: Apr. 27, 2005

(65) Prior Publication Data

US 2005/0201544 A1 Sep. 15, 2005

Related U.S. Application Data

(63) Continuation of application No. 10/157,822, filed on May 31, 2002, now Pat. No. 6,928,156.

(51) Int. Cl.
*H04M 3/42* (2006.01)
*H04M 3/00* (2006.01)

(52) U.S. Cl. ............................ 379/218.01; 379/265.01
(58) Field of Classification Search ............ 379/218.01, 379/265.01
See application file for complete search history.

(56) References Cited

U.S. PATENT DOCUMENTS

| | | | |
|---|---|---|---|
| 4,922,519 A | 5/1990 | Daudelin | |
| 5,163,083 A | 11/1992 | Dowden et al. | |
| 5,181,237 A | 1/1993 | Dowden et al. | |
| 5,524,146 A | 6/1996 | Morrisey et al. | |
| 5,684,866 A | 11/1997 | Florindi et al. | |
| 5,898,771 A | 4/1999 | Florindi et al. | |
| 6,009,161 A | 12/1999 | Babbitt et al. | |
| 6,044,142 A | 3/2000 | Hammarström et al. | |
| 6,185,289 B1 | 2/2001 | Hetz et al. | |
| 6,185,290 B1 | 2/2001 | Shaffer et al. | |
| 6,249,809 B1 | 6/2001 | Bro | |
| 6,269,337 B1 | 7/2001 | Desmond et al. | |
| 6,389,117 B1 * | 5/2002 | Gross et al. | 379/88.23 |
| 6,535,596 B1 | 3/2003 | Frey et al. | |
| 6,725,303 B1 | 4/2004 | Hoguta et al. | |
| 6,760,426 B2 | 7/2004 | Sbisa et al. | |
| 7,002,912 B2 * | 2/2006 | Wengrovitz | 370/230 |
| 2001/0040950 A1 | 11/2001 | Malik et al. | |
| 2003/0179866 A1 * | 9/2003 | Stillman et al. | 379/88.19 |

* cited by examiner

*Primary Examiner*—Rasha S Al Aubaidi
(74) *Attorney, Agent, or Firm*—Greenblum & Bernstein P.L.C.

(57) ABSTRACT

A subscriber implements and accesses telecommunications services, using a graphical user interface (GUI) via the Internet, and an interactive voice response (IVR) system via the public switched telecommunications network (PSTN). The subscriber can create preferences for calls placed to operator assistance.

20 Claims, 17 Drawing Sheets

AUTOMATED OPERATOR ASSISTANCE WITH MENU OPTIONS

CROSS-REFERENCE TO RELATED APPLICATIONS

This application is a continuation of U.S. patent application Ser. No. 10/157,822, filed on May 31, 2002 now U.S. Pat. No. 6,928,156, the disclosure of which is expressly incorporated herein by reference in its entirety. The present application is also related to U.S. patent application Ser. No. 10/134,637, filed Apr. 30, 2002, entitled "Voice Enhancing for Advanced Intelligent Network Services" in the names of Gordon L. BLUMENSCHEIN et al., which is a continuation-in-part of U.S. patent application Ser. No. 09/983,303, filed Oct. 24, 2001, entitled "System and Method for Restricting and Monitoring Telephone Calls" in the names of Nancy A. BOOK et al. and a continuation-in-part of U.S. patent application Ser. No. 09/716,276, filed Nov. 21, 2000, entitled "System and Method for Implementing and Accessing Call Forwarding Services" in the names of T. ADAMS et al., which is a continuation-in-part of U.S. patent application Ser. No. 09/619,312, filed Jul. 19, 2000, entitled "Method for Using Data Networks to Update Call Control Information in the Public Switched Telephone Network" in the names of Anil BHANDARI, et al., the disclosures of which are expressly incorporated by reference herein in their entireties.

BACKGROUND OF THE INVENTION

1. Field of the Invention

The present invention relates to the field of telecommunications. More particularly, the present invention relates to customization of menu functions presented to a caller for calls placed to operator assistance.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Authentication/Subscription Information (ASI)
Central Office (CO)
Common Object Request Broker Architecture (CORBA)
Dual Tone Multi-Frequency (DTMF)
Electronic Key Telephone System (EKTS)
Enhanced Media Resource Server (eMRS)
Extensible Markup Language (XML)
File Transfer Protocol (FTP)
Generic Data Interface (GDI)
Graphical User Interface (GUI)
HyperText Mark-Up Language (HTML)
HyperText Transfer Language Protocol (HTTP)
Incoming Call Manager (ICM)
Intelligent Peripheral (IP)
Interactive Voice Response (IVR)
Internet Call Waiting (ICW)
Lightweight Directory Access Protocol (LDAP)
Outgoing Call Control (OCC)
Operator Services Trigger (OST)
Personal Computer (PC)
Personal Call Manager/Personal Communications Manager (PCM)
Personal Identification Number (PIN)
Plain Old Telephone Service (POTS)
Public Switched Telephone Network (PSTN)
Service Control Point (SCP)
Service Management System (SMS)
Service Node/Intelligent Peripheral (SN/IP)
Service Switching Point (SSP)
Signaling System 7 (SS7)
Signaling Transfer Point (STP)
Transmission Control Protocol/Internet Protocol (TCP/IP)
Uniform Resource Identifier (URI)
Uniform Resource Locator (URL)
Uniform Resource Name (URN)
Voice Over Internet Protocol (VoIP)
World Wide Web (WWW)
World Wide Web Consortium (W3C)

3. Background Information

Callers dial "0" to reach a live operator for a variety of reasons. While some of these callers in fact need direct operator assistance, many calls to operator assistance may be handled without human intervention. To this end, interactive voice response (IVR) systems may be employed that provide a menu of options from which callers may choose. As the needs of different persons vary, it would be desirable to allow persons to customize the menu of options that are presented to the caller when the caller dials "0". The customization may be provided for in a number of manners.

Currently, subscribers to call control services within the public switched telephone network (PSTN) are able to initiate and modify their services by calling a customer service representative or by interacting with an IVR system using a standard dual tone multi-frequency (DTMF) telephone device. Some systems allow subscribers to perform these functions using packet switched data networks such as the Internet. It would be advantageous to allow subscribers to customize their operator services menu options using an IVR and/or the Internet.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
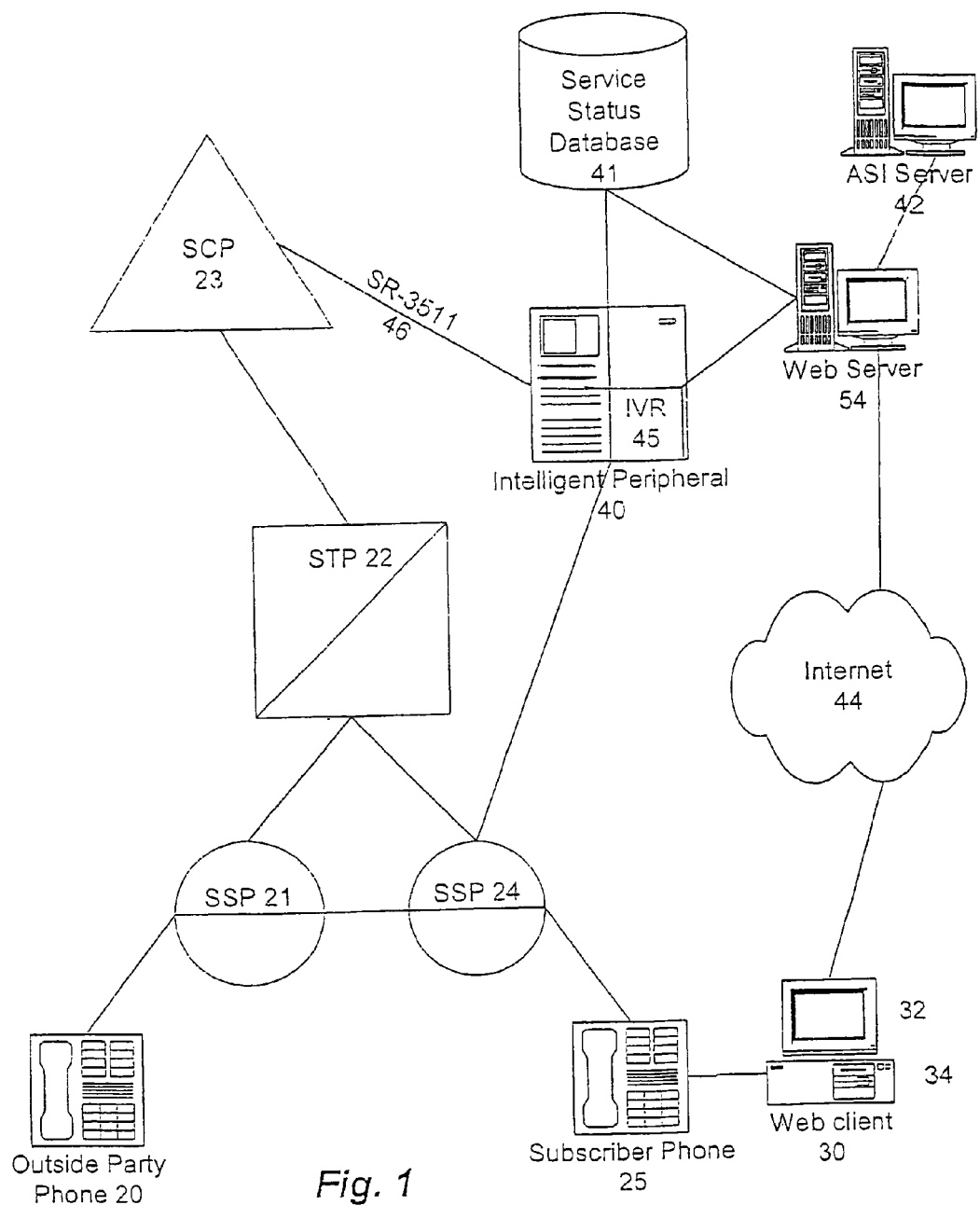
FIG. 1 is a block diagram showing an exemplary PCM telecommunications network, according to an aspect of the present invention.

The present invention relates to enhancing AIN call services to address deficiencies, simply and efficiently. The AIN call services to which the voice enhancement applies may be implemented individually or through a Personal Call Manager (PCM) system, along with other telecommunication services, such as customer operator service. The present invention is an AIN based service that allows a subscriber connected to a communications network, including the Internet and other packet switched type data networks, as well as through conventional IVR systems, to customize their operator service, with near real-time access. Using the Internet or the IVR system, subscribers are enabled by the present invention to pre-program the preferences for calls to operator assistance.

In view of the above, the present invention through one or more of its various aspects and/or embodiments is presented to accomplish one or more objectives and advantages, such as those noted below.

Accordingly, one aspect of the present invention is to provide a method for processing a call placed by a caller to operator assistance in accordance with the caller's preferences. The method includes receiving the call at a switch, suspending the call at the switch and launching a query to a service control point. Then, the caller's operator service preferences are retrieved from a database at the service control point and the call is handled in accordance with the caller's preferences.

Another aspect of the present invention is to provide a custom operator service for presenting a caller, who has placed a call to operator assistance, with a menu based upon preferences defined by the caller. The method includes receiving the call at a switch, suspending the call at the switch, and launching a query to a service control point. Then, the caller's operator service preferences are retrieved and the caller is presented with a menu of operator services, in which the menu reflects the caller's preferences. In response thereto, the caller makes a selection, which is received at the switch.

Based upon the caller's selection, a determination is made as to how to route the call, and the call is routed in accordance with the determination. The caller may be a member of a network that is distinct from a public switched telephone network.

The caller's operator service preferences may be retrieved from a database at the service control point. Additionally, the caller's operator service preferences may be presented to the caller via an intelligent peripheral.

The menu of operator services may include at least one of the following options, i.e., directory assistance, calling card calls, credit card calls, emergency services, and live operator assistance. Also, the method may include determining whether the caller is a subscriber of the custom operator service. If it is determined that the caller is not a subscriber of the custom operator service, then the caller may be routed to a live operator or an automated service. Further, the method may include presenting the menu to the caller using a recording previously recorded by the caller.

Another aspect of the present invention is provide a method for presenting a caller with a preferred menu of operator services in response to a call originating from a first network placed to operator assistance of a second network. The method includes receiving the call from the first network at a switch in the second network, suspending the call at the switch, and launching a query to a service control point. Then, the caller is presented with the preferred menu of operator services. In response thereto, the caller makes a selection, which is received at the switch. Based upon the caller's selection, a determination is made as to how to route the call, and the call is routed in accordance with the determination.

In one scenario, the call may be routed to a location within the first network. The menu of operator services may include at least one of the following options, i.e., directory assistance, calling card calls, credit card calls, emergency services, live operator assistance, and a location within the first network.

Another aspect of the present invention is to provide a method of configuring a subscriber's preferences that determine the processing of calls placed to operator assistance. The method includes authenticating the subscriber, receiving, and storing the subscriber's preferences. As a result, a menu reflecting the subscriber's preferences is presented to the subscriber when the subscriber places a call to operator assistance. The subscriber's preferences may be received, for example, via the Internet or an interactive voice response system.

The subscriber's preferences may be stored at a service control point. Additionally, the subscriber's preferences may be stored at an intelligent peripheral. The subscriber's preferences may be received, for example, via the Internet or an interactive voice response system.

Another aspect of the present invention is to provide a telecommunications system for routing a call from a subscriber of a custom operator service to operator assistance. The system includes a database that stores a subscriber's operator service preferences and an intelligent peripheral that presents the subscriber's operator service menu in response to a call from with the subscriber. As a result, the subscriber is prompted to select from the menu and the call is routed in accordance with the subscriber's selection.

The system may include a service management system that allows a subscriber to interface with a service control point in order to pre-program the subscriber's operator service preferences. Also, the system may include a service control point that retrieves the subscriber's operator service preferences upon receiving a query from a switch. Further, the system may include a switch that routes the call to an extension in a subscriber network that originated the call.

Another aspect of the present invention is to provide a computer readable medium in a custom operator service for presenting a subscriber, who has placed a call to operator assistance, with a menu based upon preferences defined by the subscriber. The computer readable medium includes a retrieving source code segment that retrieves a subscriber's preferences from a database, a presenting source code segment that presents the menu in accordance with a subscriber's preferences, and a determining source code segment that determines how to route the call in accordance with a menu selection chosen by the caller.

The computer readable medium may include a routing source code segment that routes the call in accordance with the determination. Also, the menu may include at least one of the following options, i.e., directory assistance, calling card calls, credit card calls, emergency services, and live operator assistance.

The various aspects and embodiments of the present invention are described in detail below.

Personal Call Manager

The Personal Call Manager (PCM) service is an AIN based service that allows a subscriber connected to a communications network, including the Internet and other packet switched type data networks, as well as through IVR systems, including IVR functionality provided by SN/IPs, to customize and execute services associated with telephonic communications, with near real-time access to the service data. PCM enhances functionality and compatibility with other AIN based call control services, including, for example, the custom operator service, discussed below.

FIG. 1 illustrates an exemplary telecommunications network in association with PCM. The network includes an outside party telephone 20, service switching points (SSPs) 21 and 24, and a subscriber telephone 25. The subscriber telephone 25 is any type of PSTN compatible telephone, including a plain old telephone service (POTS) telephone, or a telephone in a Centrex system, a PBX system or electronic key telephone system (EKTS). The exemplary network also includes a signaling transfer point (STP) 22, a service control point (SCP) 23 and an AIN intelligent peripheral (IP) 40, which incorporates an IVR 45.

By way of example, the SCP 23 is implemented with the Telcordia Integrated Service Control Point, loaded with ISCP software Version 4.4 (or higher), available from Telcordia, Murray Hill, N.J. In an alternative embodiment of the invention, the SCP 23 may be a Lucent Advantage SCP, with software release 94 (or higher) available from Lucent Technologies, Inc.

Depending on the call origination point, the SSP 21 and the SSP 24 may be either the originating or the terminating switch. For example, if a call is placed from the outside party telephone 20 to the subscriber telephone 25, the SSP 21 is the originating switch and the SSP 24 is the terminating switch. If a call is placed from the subscriber telephone 25 to the outside party telephone 20, the SSP 24 is the originating switch and SSP 21 is the terminating switch. However, as a practical matter, the originating switch and the terminating switch may be the same, or the call may be routed through any number of intervening switches in the PSTN between the originating and the terminating switches. The SSPs 21 and 24 include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize AIN protocol. However, embodiments of the present invention may include switches, such as ATM switches, that are incorporated into any alternative telecommunications technology.

The call flow logic of the present invention may be upgraded to accommodate future AIN releases and protocols and future trigger types. Specifications of AIN SSPs may be found in Telcordia GR-1299-CORE, Switch-Service Control Point Application Protocol Interface Generic Requirements, and Telcordia GR-1298-CORE, AIN Switching Systems Generic Requirements, the disclosures of which are expressly incorporated by reference herein in their entireties.

In alternative embodiments, the intelligent peripheral 40 may be a SN/IP, such as an IBM Resource Manager, a Lucent Compact Service Node or a Lucent Enhanced Media Resource Server (eMRS). The data network communicates to the PSTN (specifically the SCP 23) through the intelligent peripheral 40 using the SR-3511 protocol 46, or an equivalent protocol. Also, as stated above, the IVR 45 of the intelligent peripheral 40 is accessible through a PSTN central office switch (CO), such as the SSP 21 or the SSP 24. The intelligent peripheral 40 communicates with the switches using the GR-1129 protocol.

An associated data network includes a web client 30, a web server 54, an authentication/subscription information server 42 and a service status database 41, connectable through the Internet 44. Although FIG. 1 depicts a direct connection between the Internet 44 and the web client 30, such as a conventional Ti or cable modem connection, it is intended to include any type of Internet interface, including a telephone modem connection through the subscriber phone 25 and the associated SSP 24. The web client 30 includes a GUI 32, i.e., a PC, operating client software 34, an example of which is an internet call waiting (ICW) client, available from Southwestern Bell Telephone Company. Alternatively, the client software 34 can be run at the web server 54. The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

Figure 2:
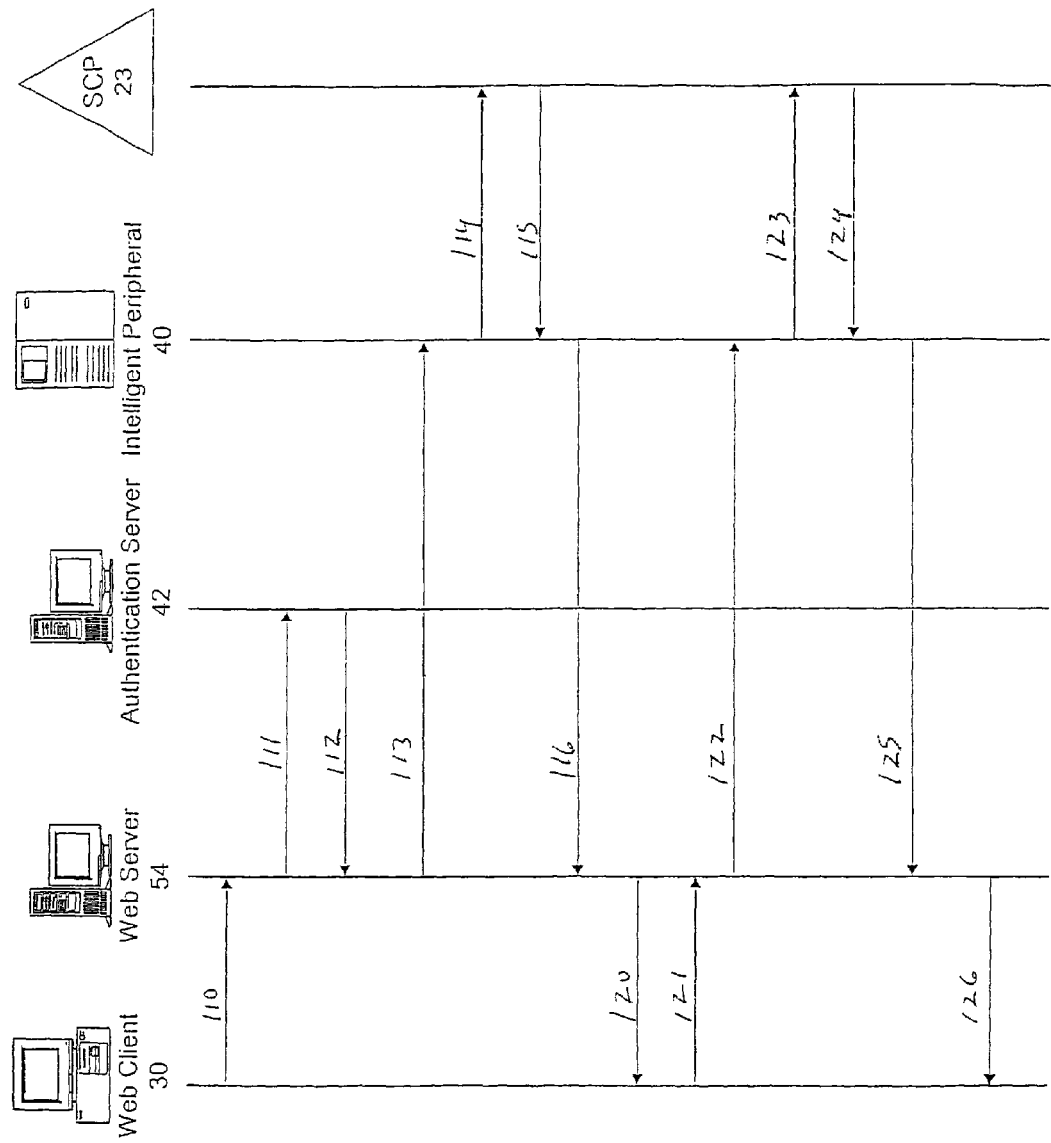
FIG. 2 is a call flow diagram illustrating subscriber requests for information from the PCM system, according to an aspect of the present invention.

FIG. 2 is an exemplary call flow diagram depicting a subscriber using the PCM service. Initially, the subscriber accesses a public packet switched data network, such as the Internet, from a web client 30, using a web browser such as Microsoft Internet Explorer, Netscape Navigator or Hotjava. Once on the Internet, the subscriber connects to the web server 54 at step 110, which serves as a secure access platform. The web server 54 receives HyperText Transfer Language Protocol (HTTP) messages from the web client 30 and provides HyperText Markup Language (HTML) or Extensible Markup Language (XML) web pages in response to the subscriber's input to the web client 30. The web pages relate to the subscriber's PCM account.

Once connected to the web server 54, the user must first log-in to the PCM account, also depicted at block 201 in FIG. 4 and described below. The log-in equates to an authentication of the user. To perform the authentication, the web server 54 contacts the authentication/subscription information (ASI) server 42 at step 11, which confirms that the subscriber is an authorized user by verifying at least the subscriber's name and a password. The ASI server 42 also provides to the web server 54 a list of the services to which the user has subscribed in the PCM account at step 112. The services for each phone number are linked to the PCM account through the ASI server 42.

At steps 113 and 114, the web server 54 then retrieves from the SCP 23, via the intelligent peripheral 40, current service data and the related status of the various services, such as custom operator service, managed through the PCM account. The data and status of the services, i.e., service data, is forwarded to the web client 30 at steps 115 and 116. A PCM summary page is displayed on the web client 30 at step 120, as seen for example in FIG. 7, discussed in detail below.

Figure 3:
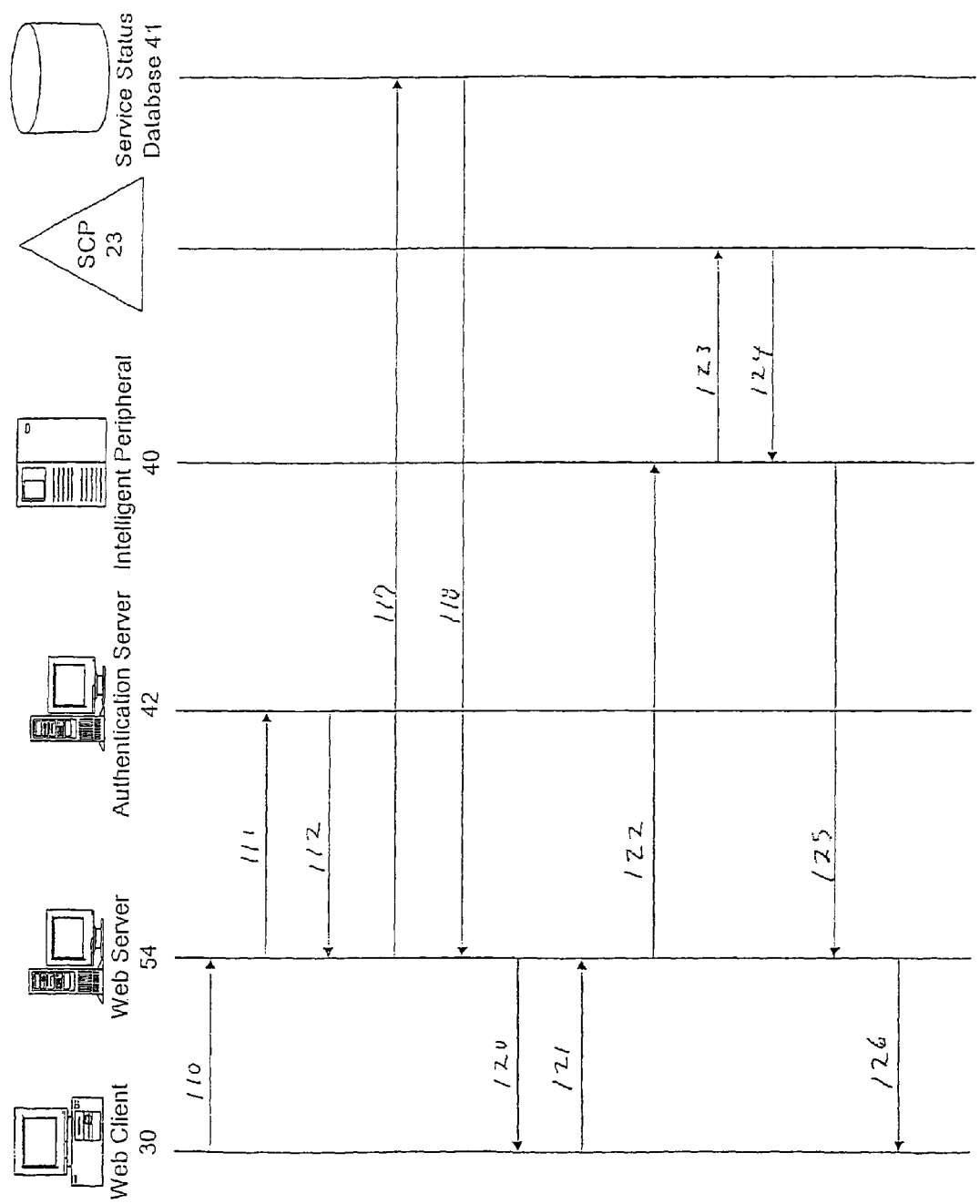
FIG. 3 is a call flow diagram illustrating subscriber requests for information from the PCM system, according to an alternative embodiment of the present invention.

In another embodiment, depicted in FIG. 3, after logging in and being authenticated at steps 110-112, the web server 54 retrieves from a service status database 41 the data and status of the various services managed through the PCM account at steps 117 and 118, rather than from the SCP 23, directly. This database serves as a cache for the service information in the SCP 23. The service status database 41 contains information current to the most recent update interface with the SCP 23. The cache arrangement enables the user to efficiently access this information without waiting for the SCP 23 to process the request. At the same time, it reduces SCP 23 traffic. The service status database 41 is refreshed periodically to ensure currency, as well as pursuant to a specific command by the user. This database is a conventional lightweight directory access protocol (LDAP) database, such as the LDAP database available from Lucent Technologies, Inc. In the alternative, the database may be a standard relational database, such as those available from Oracle Corporation or Sybase, Inc.

Upon review of the service status, the user may choose to interact with one or all of the available services, as shown in FIGS. 2 and 3. When the user selects a desired service, a message is sent at step 121 to the web server 54, which responds with the corresponding service screen. When the user selects a particular service necessitating access to the PSTN, the request is sent to the intelligent peripheral 40 at step 122.

Significantly, the intelligent peripheral 40 may be the same intelligent peripheral that implements IVR access to the user's services through a conventional PSTN. The intelligent peripheral 40 internally translates data messages received from the web server 54 and accesses the relevant call services data from the SCP 23 at step 123 through the SR-3511 protocol, the use of which enables the simultaneous compatibility with functions of the IVR 45. Details of the SR-3511 protocol are provided in Telcordia, Recommendation SR-3511 SCP Intelligent Peripheral (IP) Interface Specification for TCP/IP, Version 5.0 (January 1997), the disclosure of which is expressly incorporated by reference herein in its entirety. In various embodiments, the translation program is in C, C++ or JAVA. The intelligent peripheral 40 then transmits a summary of the requested service, based on information received from the SCP 23 at step 124, to the web server 54 at step 125. The web server 54 sends the information to the web client 30 at step 126 to be displayed to the user.

At this point, the user may choose to update or to simply review the service information. When the service is updated, the web server 54 sends the update instructions in a data message to the intelligent peripheral 40. The intelligent peripheral then translates the update instruction into the SR-3511 protocol and communicates the updated service parameters directly to the SCP 23.

For example, one available service is call manager, which includes an Incoming Call Manager (ICM), by which the user may prioritize, forward, preview or block selected telephone numbers. In the update procedure, the subscriber enters a telephone number to be blocked, for instance, which the web server 54 communicates to the intelligent peripheral 40. The intelligent peripheral 40, in turn, sends the data via SR-3511 to the SCP 23, which flags the number to be blocked. Because the instructions of the intelligent peripheral 40 to the SCP 23 are sent and implemented immediately, without the involvement of the provider's account management or customer service, the changes to the service are operable and available shortly after the user sends the instructions. In an embodiment that includes the service status database 41, the cache will then be updated in due course to reflect the updated information in the SCP 23.

Figure 4:
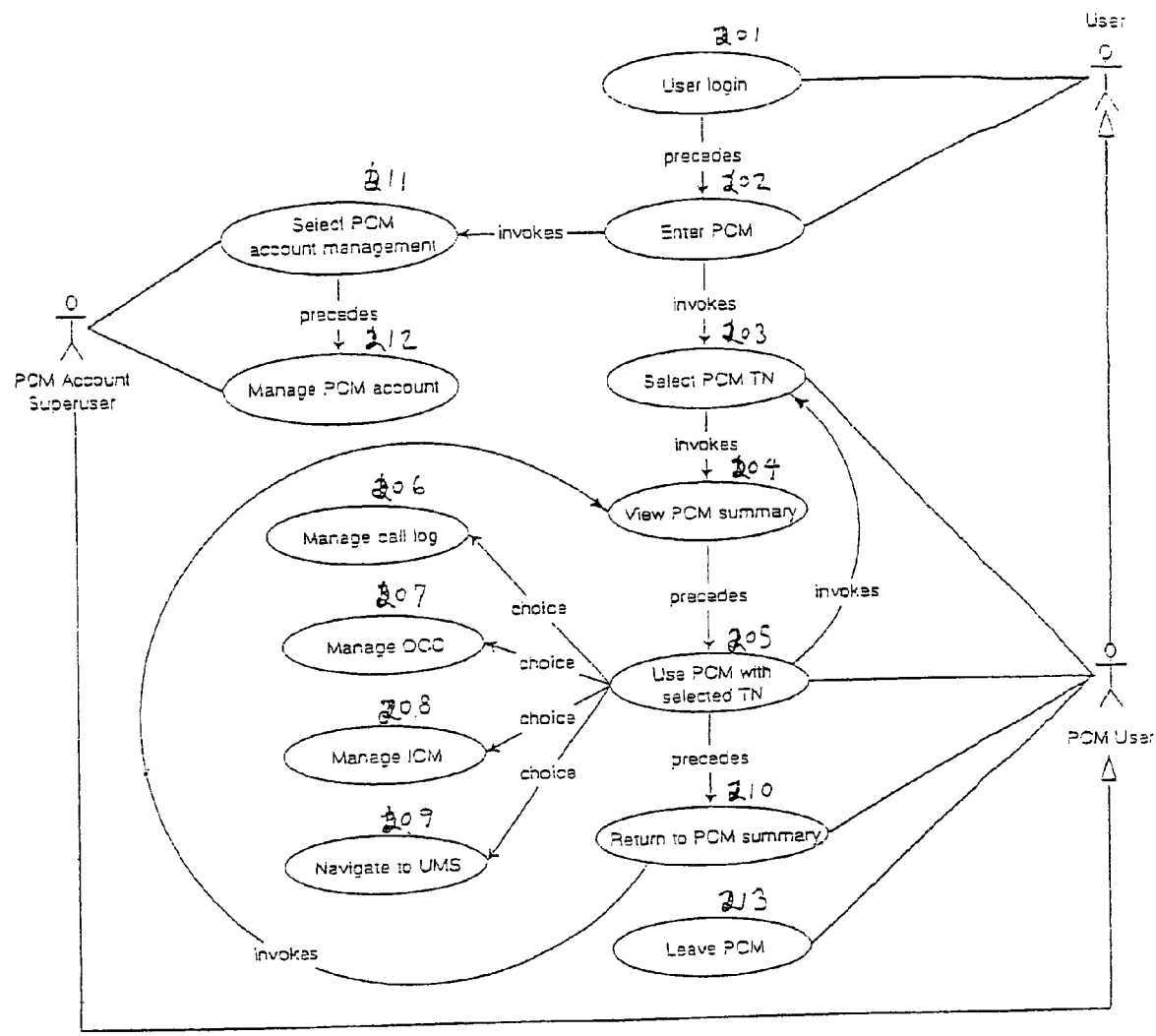
FIG. 4 illustrates user action in an exemplary web-based PCM system, according to an aspect of the present invention.
Figure 5:
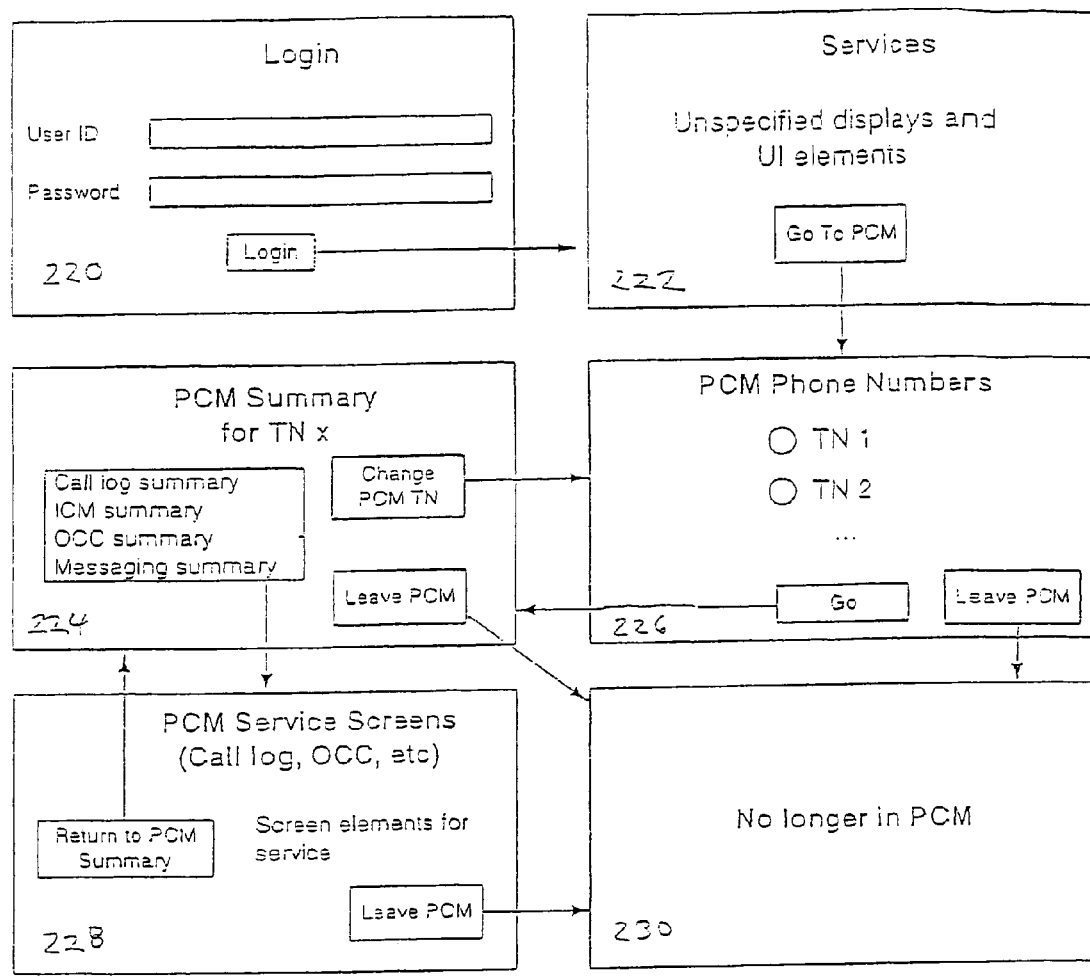
FIG. 5 illustrates an exemplary window navigation flow for basic user actions, according to an aspect of the present invention.

FIG. 4 depicts the procedure followed by the subscriber when first entering the PCM web site. The subscriber must first log-in at block 201. Assuming the subscriber's PCM account has already been established, he or she must provide the authentication data to proceed. The authentication data is entered at a log-in screen, an example of which is depicted in FIG. 5 at screen 220. To maintain the integrity of the secure platform, authentication preferably requires a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the web server 54 responds with a message explaining the problem and allows another chance to enter correct data.

Figure 6:
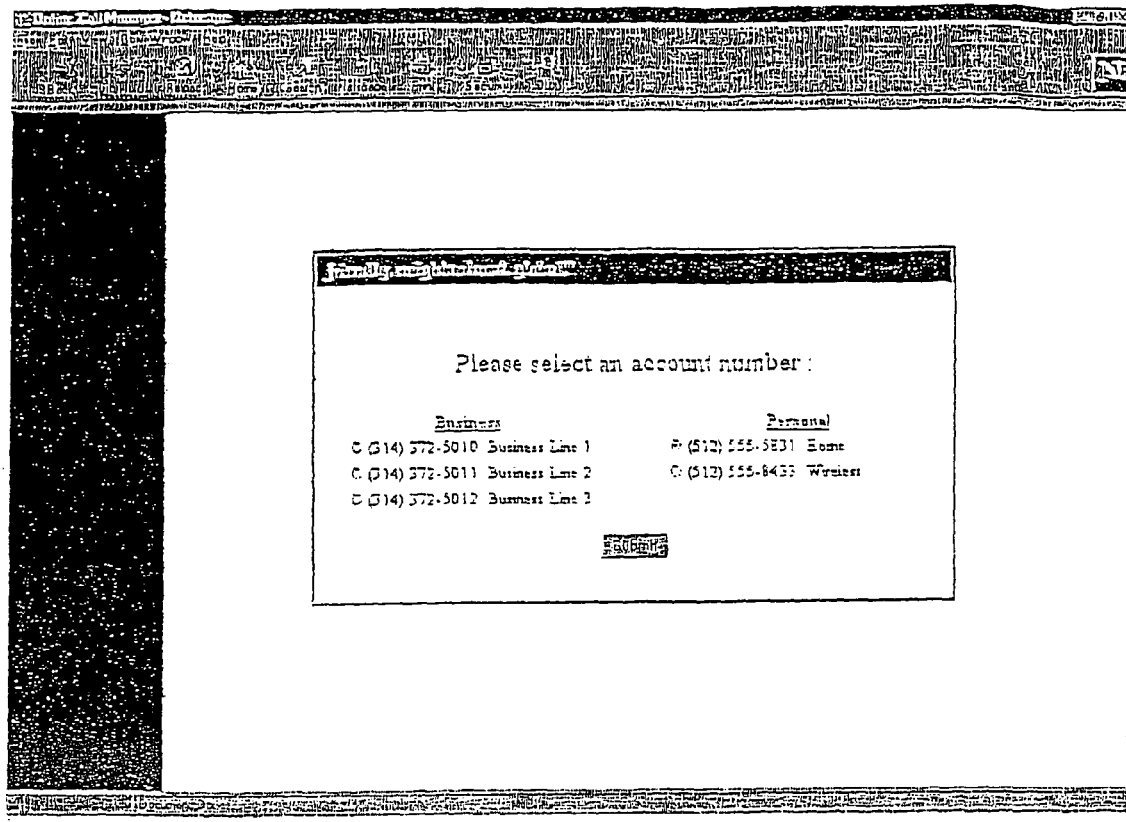
FIG. 6 is an exemplary window to be displayed at the user's PC requesting identification of a PCM account number, according to an aspect of the present invention.

After the user is authenticated, the user proceeds to enter the PCM at block 202. At this time, the user views a general informational screen 222 of FIG. 5, which is formatted at the discretion of the service provider. It may include, by way of example, new services offered to the subscriber. After the user elects to proceed into the PCM, the web server 54 navigates to a page 226 that displays telephone numbers associated with the PCM account(s) to which the user belongs and to which the user is authorized to access. FIG. 6 depicts an exemplary screen displaying phone numbers to which the user has access.

At this point, the user selects a telephone number at block 203 and the corresponding services are displayed for the selected telephone number at screen 224. The user may then elect to implement the various services in place for a particular phone number. In an embodiment of the invention, if the user selects the custom operator service in the PCM account, he or she may further be required to enter the appropriate PIN. Alternatively, at block 202 the user may elect to manage the PCM account at blocks 211 and 212, depending on the user's privileges, assigned by the subscriber, within a particular account to manage the PCM account.

If the PCM has more than one associated telephone number, the user would see a web page listing the numbers, as in screen 226 of FIG. 5 and FIG. 6. The screen has user interface elements that allow the user to select one of the numbers. Thus, each PCM account keeps track of a non-empty set of phone numbers to be managed through the PCM on behalf of the corresponding set of users, presumably members of a family, business, organization or other group related to the subscriber.

After the user selects a phone number at block 203, the system displays for the user a PCM summary page 204 corresponding to the selected telephone number. The PCM summary page displays only data the user is authorized to see for the selected telephone number. As shown at screen 224, the PCM summary provides various options to the user, including by way of example, selecting from among listed services 206-209, returning to select an alternative PCM telephone number or exiting PCM altogether 213.

Figure 7:
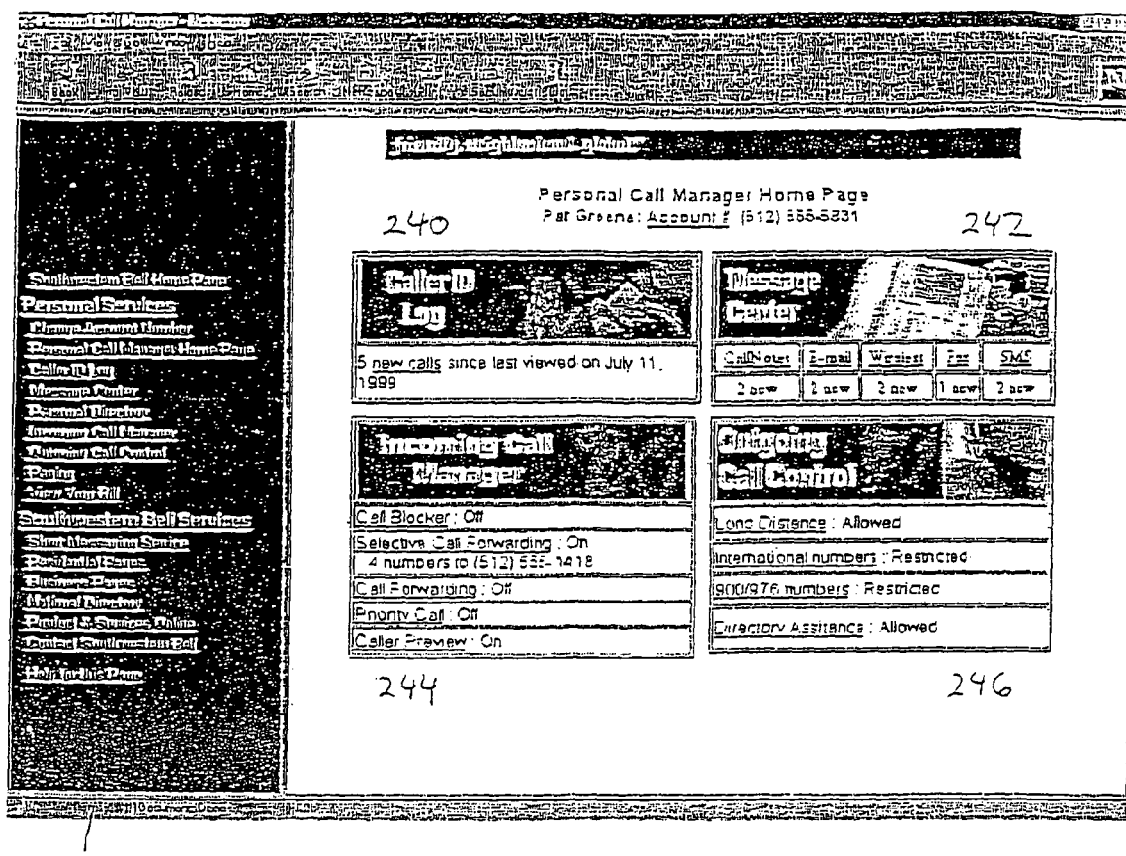
FIG. 7 is an exemplary PCM home page window to be displayed at the user's PC identifying customized user options for a selected account number, according to an aspect of the present invention.

FIG. 7 shows an exemplary PCM summary display, which corresponds to screen 224 of FIG. 5, entitled Personal Call Manager Home Page for account number (512) 555-5831, which is the selected telephone number in the example. FIG. 7 shows four services accessible through the PCM, although the four services are not intended to be limiting. That is, the PCM is able to administer any call services associated with an SCP 23. The services depicted in the PCM summary screen 224, as well as in FIG. 7, are Caller ID Log 240, Message Center 242, Incoming Call Manager (ICM) 244 and Outgoing Call Control (OCC) 246. The displayed information is summary in fashion, the details being available to the user through selection of one of the available services, which displays a PCM service screen 228 of FIG. 5. At the summary screen, the Caller ID Log 240 of FIG. 7 retrieves data from the SCP 23 and shows, for example, the number of call records added since the last review. The Message Center 242 retrieves data from the SCP 23 and shows the number of new call notes, e-mails, wireless calls, faxes and messages reviewed. The ICM 244 of FIG. 7 likewise retrieves data from the SCP 23 and shows the status of the call blocker, call forwarding, priority call and caller preview features. The OCC summary retrieves data from the SCP 23 and shows whether international calls, long distance calls, 900/976 numbers and/or directory assistance calls are restricted.

From the PCM summary screen, the user may choose to use PCM to manage any of the displayed services, indicated at block 205 in FIG. 4. This is done by simply clicking on one of the display boxes 240-246 of FIG. 7 to cause the web server 54 to display a new web page corresponding to the selected service. Or, the PCM summary page includes a list of the personal services 248, which duplicates the display boxes. In addition, the list 248 may include additional personal services that do not require interaction with the SCP 23. These services include, for example, a personal directory, paging capability and billing review.

The paging capability provides the option of paging the subscriber when a caller ID is received from a subscriber specified phone number. Paging may include a page, a wireless short message, an e-mail, or a generated phone call to a specified number. Moreover, caller ID logs can be collected and paged to the subscriber at periodic intervals with summary and/or detailed information.

After selection of one of the services, the web server 54 navigates to and displays the selected services web page, indicated by blocks 206-209, and displays the corresponding service screen 228 of FIG. 5. The user may review information, activate or deactivate the service or change the scope of the service, as desired, in accordance with the level of access available to that user. After accessing one of the available services, the user may return to the PCM summary page at block 210. Returning can be accomplished by selecting a specific option to return or by simply clicking the BACK icon provided by the web browser. The user may also exit PCM at block 213 of FIG. 4, ending the current session at block 230 of FIG. 5.

As stated above, the subscriber may interface with the PCM service, as well as the individual AIN calling services that may be implemented through the PCM service, through the IVR 45 of the intelligent peripheral 40. From any DTMF telephone, the subscriber dials a toll-free number, e.g., an 800 number or local service provider number, to access the IVR 45. Alternatively, the subscriber may dial a star code, such as *95, in response to which the SSP 24 has been programmed to route the connection to the IVR 45 to access a particular AIN service, such as call blocking, discussed below. Once the connection is established, the IVR 45 prompts the subscriber to enter an account number, along with a password or PIN, using the touch tone keypad of the DTMF telephone. Upon successful authentication, the subscriber has the ability to perform any number of administrative and operational functions, such as changing or adding PINs, toggling the services ON and OFF and activating or deactivating customized lists and schedules.

In an embodiment of the invention, the intelligent peripheral 40 (and the IVR 45) are provided with speech recognition functionality. For example, in response to automated voice prompts, an IBM Resource Manager, programmed with speaker independent Nuance 8.0 speech recognition software, available from Nuance Communications, may receive and interpret voice input from the caller, in addition to touch tone signals. Any comparable speech recognition system may likewise be incorporated into the system, such as a Lucent Compact Service Node.

The intelligent peripheral 40 with speech recognition functionality captures analog voice signals of the subscriber and converts the voice signals to digital data, which may be stored in relation to the subscriber's account. The data is segmented, or arranged into recognizable patterns, and compared to previously stored models of words to be recognized.

The segmentation of data may be based on any number of conventional speech recognition techniques. For example, the data may be segmented into phonemes, which are basic sounds or units of speech, and compared to phonetic models to build and identify words. The phoneme based speech recognition may enable identification of continuous or fluent speech from the subscriber. Alternatively, the speech data may be segmented by timing to search for and match previously identified anticipated responses, such as simple words and phrases, including numbers, letters of the alphabet and predetermined command words, such as ON, OFF and the days of the week. The present invention may incorporate any level of speech recognition and associated vocabulary capable of handling basic IVR interactions between the subscriber and the AIN services.

Furthermore, the intelligent peripheral 40 may confirm subscriber responses that result in a low level of confidence in the speech recognition. In other words, the processed subscriber data may be converted into synthesized speech, generated at the intelligent peripheral 40 and transmitted to the subscriber for confirmation. For example, after requesting and receiving the numbers of the subscriber's PIN, the intelligent peripheral 40 generates a prompt asking, "You said that your PIN was '1234.' Please say 'yes' if this is correct and 'no' if this it is not correct."

When the intelligent peripheral 40 includes speech recognition capability, the subscriber is further able to access the PCM and related services from a non-DTMF telephone, as well. Also, even when using a DTMF telephone, the subscriber may choose to verbally interact with the intelligent peripheral 40, avoiding having to tediously input touch tones from the telephone keypad and saving time and effort, which is especially advantageous when long series of numbers, such as account numbers or PINs, are involved. In an embodiment of the invention, Nuance Verifier 3.0 software may be incorporated in the intelligent peripheral 40 to further enable verification based on the caller's voice print, enabling efficient authentication, in addition to convenient speech interaction.

Figure 8:
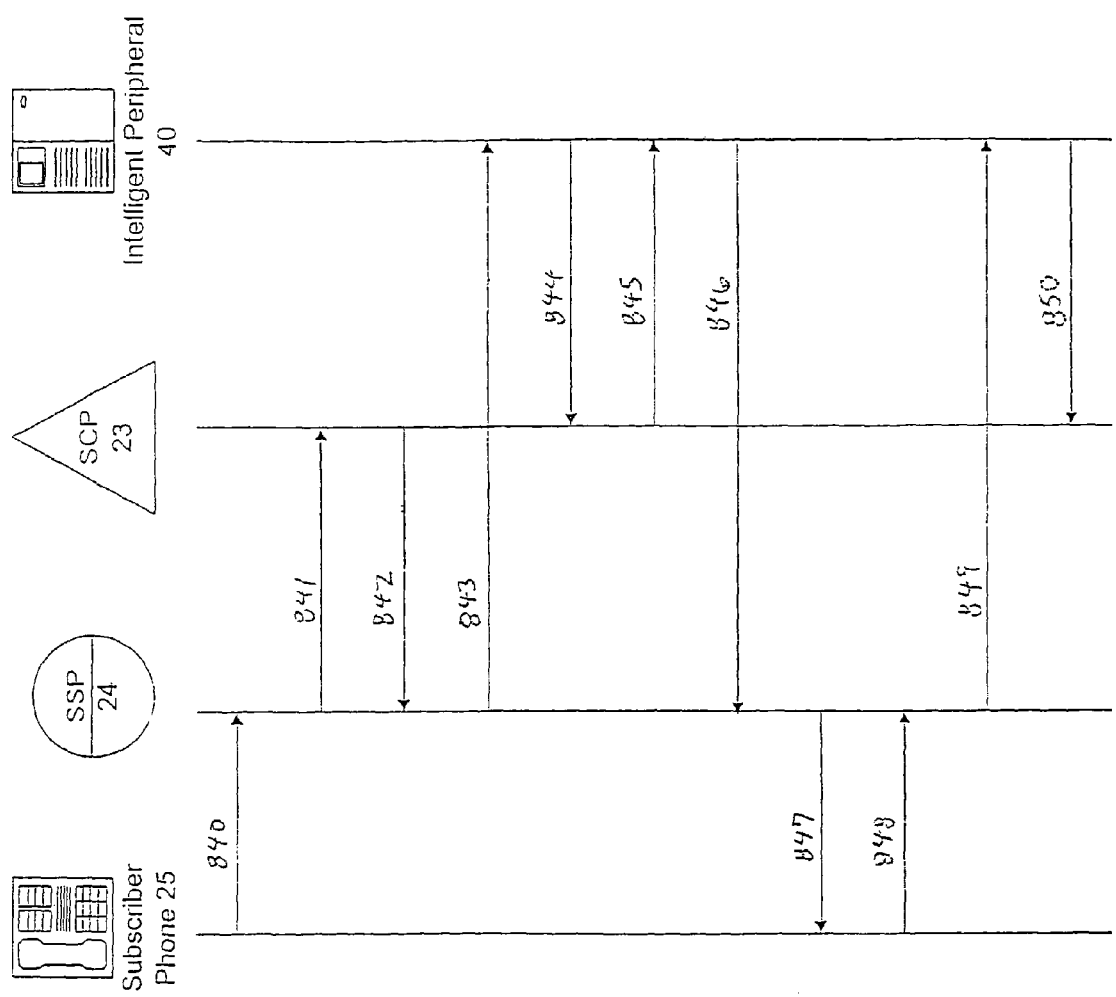
FIG. 8 is a call flow diagram illustrating subscriber requests for information from the PCM system using voice recognition, according to an aspect of the present invention.

When the subscriber wishes to review or edit call service data using speech recognition, the subscriber dials a toll-free number, e.g., an 800 number or local service provider number to access the IVR 45 of the intelligent peripheral 40, as described above. Referring to FIG. 8, the SSP 24 receives the dialed number from the subscriber telephone 25 at step 840 (assuming the subscriber calls from the subscriber telephone 25). The SSP 24 suspends the call and queries the SCP 23 at step 841 based, for example, on the calling party number and/or the dialed number. In response, the SCP 23 instructs the SSP 24 at step 842 to connect with the intelligent peripheral 40 temporarily to enable the speech recognition functionality of the intelligent peripheral 40. At step 843, the SSP 24 establishes the temporary connection to the intelligent peripheral 40 using GR-1129 protocol, without actually routing the call to the intelligent peripheral 40.

The substance of the voice interaction is dictated by the call service data in the subscriber's PCM account, as well as any related call services implemented independently or through the PCM service, as discussed below. When the call service data is stored in the SCP 23, the intelligent peripheral 40 retrieves the status and service information from the SCP 23 using SR-3511 at steps 844 and 845. In an alternative embodiment, the intelligent peripheral 40 may receive the call service data from the SCP 23 through a common object request broker architecture (CORBA) or a transmission control protocol/Internet protocol (TCP/IP) interface. The intelligent peripheral 40 may alternatively retrieve the call service data from an external database, such as the service status database 41 or other database. The SCP 23 is likewise able to retrieve data from the intelligent peripheral 45, or an external database related to the AIN service, through a generic data interface (GDI) server, for example, invoked by a GetData command, as specified in SR-3389. Details of SR-3389 are provided in Telcordia ISCP Generic Data Interface Specification for TCP/IP, Version 5.0 (May 1999), the disclosure of which is expressly incorporated by reference herein in its entirety.

Based on the status and call service data, the intelligent peripheral 40 plays announcements to the subscriber through the SSP 24 at steps 846 and 847. The subscriber's voice responses are received by the intelligent peripheral 40 through the SSP 24 at steps 848 and 849. The communications between the SSP 24 and the intelligent peripheral 40 incorporate GR-1129 protocol throughout the transaction. Changes made by the subscriber to the status and call service data through the speech recognition functionality are subsequently stored in the respective database, e.g., the SCP 23, at step 850 for implementation.

In an embodiment of the invention requiring authentication data, the intelligent peripheral 40 may initiate communication with the subscriber prior to retrieving status and service information from the SCP 23 at steps 844 and 845. Alternatively, when authentication data is stored at a database other than the SCP 23 (e.g., the ASI server 42), the intelligent peripheral 40 perform additional steps to retrieve the authentication data and query the subscriber through the SSP 24, accordingly.

Figure 9:
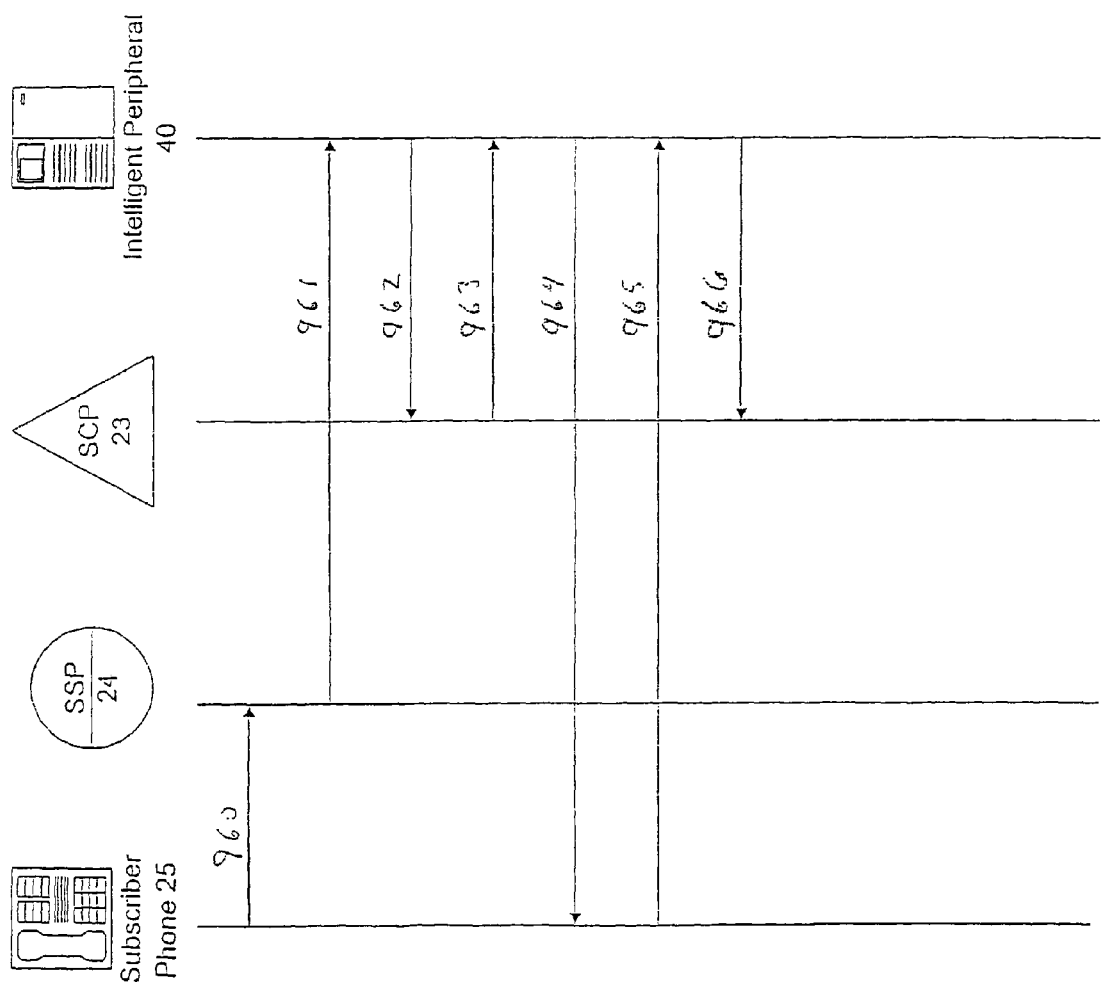
FIG. 9 is a call flow diagram illustrating subscriber requests for information from the PCM system using voice recognition, according to an alternative embodiment of the present invention.

FIG. 9 depicts another embodiment of the invention involving speech recognition. The subscriber dials the toll-free number or star code to access the IVR 45 of the intelligent peripheral 40, as described above. At step 960, the SSP 24 receives the dialed number from the subscriber telephone 25 (assuming the subscriber calls from the subscriber telephone 25). The SSP 24 routes the subscriber's call to the intelligent peripheral 40 at step 961, either through normal translations or based on instructions from the SCP 23 in response to a query from the SSP 24 (not pictured). The intelligent peripheral 40 then directly interacts with the subscriber, playing announcements and receiving voice responses. In particular, when the call service data is stored in the SCP 23, the intelligent peripheral 40 retrieves the status and service information from the SCP 23 using SR-3511, CORBA or TCP/IP at steps 962 and 963, in the same manner discussed above. Based on the status and call service data, the intelligent peripheral 40 plays announcements to the subscriber at step 964 and receives the subscriber's voice responses at step 965. Changes made by the subscriber to the status and call service data through the speech recognition functionality are subsequently stored in the respective database, e.g., the SCP 23, at step 966 for implementation.

Some call services implemented through the PCM service may include IVR interaction with an outside party caller, such as custom operator service, discussed below. The IVR interaction with the caller may likewise include speech recognition. When speech recognition is involved, the outside caller may interact with the intelligent peripheral 40 in the same manner indicated in FIG. 8 or FIG. 9. In particular, when the caller initiates a call from the outside party telephone 20, for example, to the subscriber telephone 25, the SSP 24 is the terminating switch. Consistent with FIG. 8, the SSP 24 queries the SCP 23 which identifies the particular calling service to be invoked. In response to the call, the SCP 23 instructs the SSP 24 to connect the caller to the intelligent peripheral 40 temporarily to enable the speech recognition. The intelligent peripheral 40 then communicates with the caller through the SSP 24 using GR-1129 protocol to enable announcements to be played and voice responses to be received from the caller. Alternatively, the SCP 23 may instruct the SSP 24 to route the call to the intelligent peripheral 40. Consistent with FIG. 9, the intelligent peripheral 40 then directly interacts with the caller, playing announcements and receiving voice responses. The intelligent peripheral 40 may subsequently route the call (if necessary) to the SSP 24 for connection using a two B-channel transfer, a release link transfer, a tied-up connection, or the like. Any caller data received through the speech recognition functionality that must be stored (e.g., data enabling customized reports, such as call detail records) is stored in the applicable database (e.g., the SCP 23), as discussed above.

Figure 10:
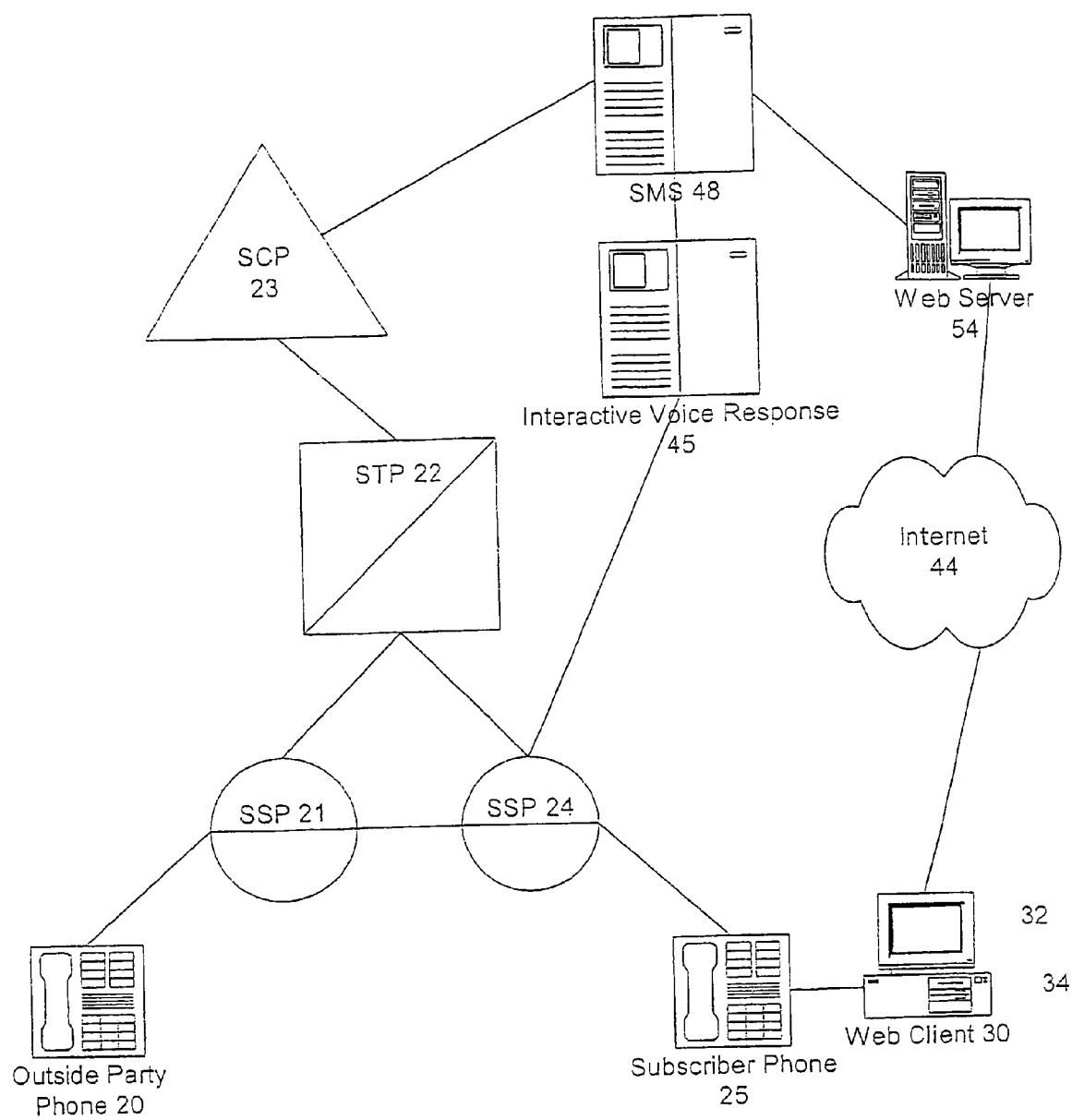
FIG. 10 is a block diagram showing an alternative exemplary PCM telecommunications network, according to an aspect of the present invention.

FIG. 10 depicts an alternative embodiment of the invention in which a service management system (SMS) 48 serves as the interface between the web server 54 and the SCP 23, as opposed to the intelligent peripheral 40. The SMS 48 is capable of transmitting and receiving information to and from the SCP 23. The SMS 48 also enables the subscriber to interface with the SCP 23 from both the subscriber phone 25 (or other DTMF telephone) through the IVR 45 and from the web client 30 (or other Internet compatible device) through the web server 54, via the Internet 44. Because an intelligent peripheral 40 is not necessary, an independent IVR 45 may be included in the network. For example, the IVR 45, available under the trademark CONVERSANT System for IVR, Version 6.0, Update 1, provided by Lucent Technologies, Inc., may be used. Although not pictured in FIG. 10, the network may further include an external database connected to the SMS 48, such as the service status database 41, and a separate authentication platform, such as the ASI server 42.

The PCM service implemented with the SMS 48 functions in a similar manner as described in FIGS. 2 and 3 with respect to the intelligent peripheral 40. Generally, the SMS 48 receives data regarding the PCM service from the SCP 23 and sends the data to the web server 54, which causes the data to be displayed at the web client 30. In turn, changes to the PCM service are forwarded from the web client 30, through the web server 54, to the SMS 48, which stores the data and updates the SCP 23 to implement the modified PCM service.

Custom Operator Service

Custom operator service is an AIN-based service that allows a subscriber connected to a communications network, including the Internet and other packet switched type data networks, as well as through conventional IVR and/or SMS and/or intelligent peripheral systems, to configure their operator services. The custom operator service may be implemented as an independent service or part of a PCM portfolio of AIN services.

Calls made to operator assistance by dialing "0" may be immediately routed to a live operator who is able to assist the caller. However, many functions handled by the operator may be automated using, for example, an IVR. That is, callers dialing "0" may be presented with a menu of commonly requested functions. It would be advantageous to allow a subscriber to customize the menu of functions presented when dialing "0" for operator assistance.

Figure 11:
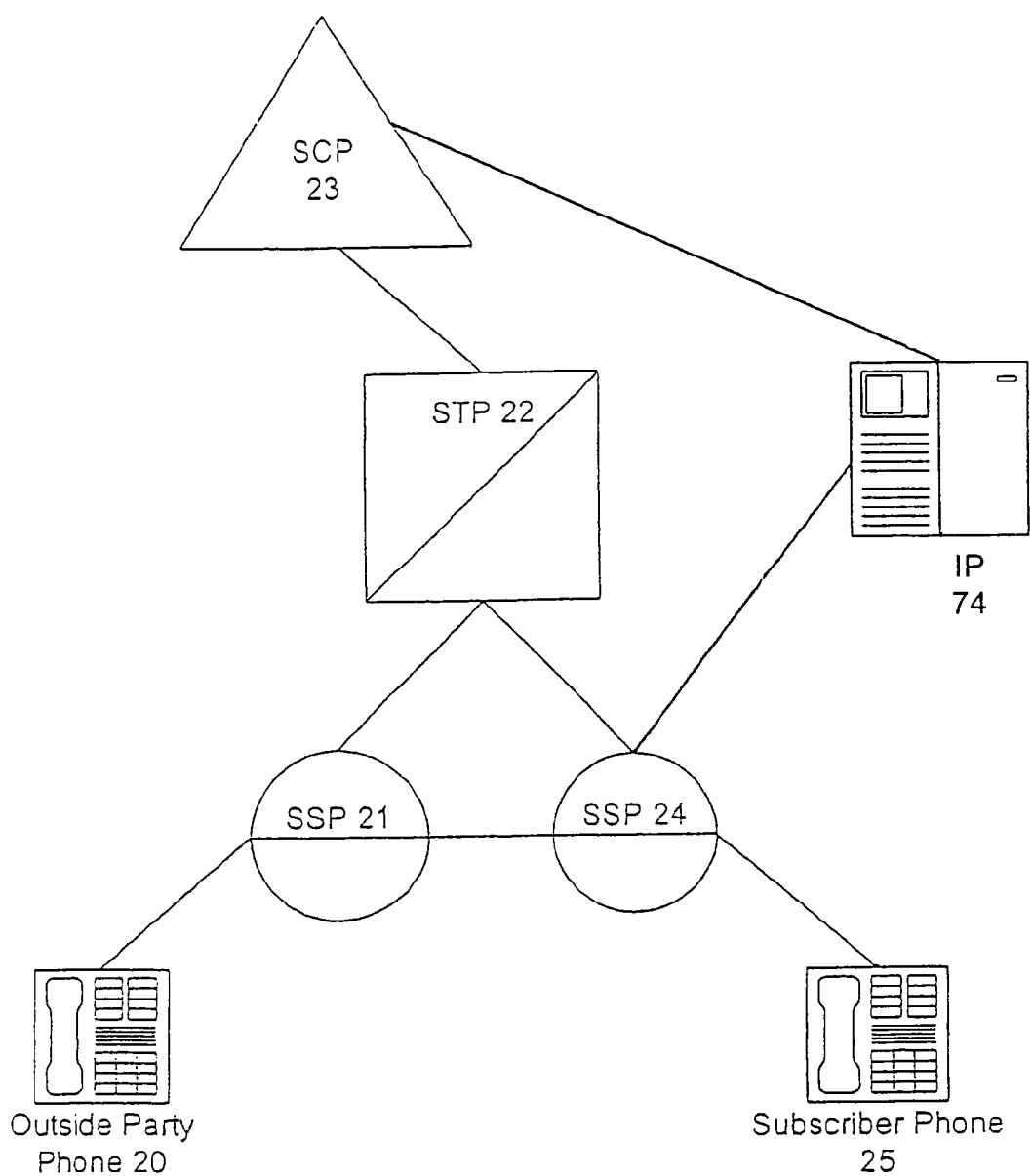
FIG. 11 is an exemplary telecommunications network, according to an aspect of the present invention.

FIG. 11 is an exemplary telecommunications network, according to an aspect of the present invention. The individual elements of FIG. 11 are identical to those in FIG. 10 and for the sake of brevity, will not be repeated. When the subscriber dials "0" using subscriber phone 25, the call is suspended at the SSP 24 by virtue of an operator services trigger (OST) in the switch. The trigger also causes the SSP 24 to transmit an AIN query message including at least the calling party number via the SS7 network and the appropriate STP 22 to the SCP 23. It is noted that "0" plus digits, "0" minus digits, or "0" preceded by a carrier code (e.g., 101XXXX) may cause the trigger to launch the query and will be used interchangeably herein, i.e., "0", "00", "10XXXX 0", "101XXXX 00", "0+", "01+", "101XXXX 0+", "10XXXX 01+".

The SCP 23 performs a look up in a database to determine if the caller is a subscriber to the custom operator service. If the caller is not a subscriber, then the call is routed in a conventional manner, e.g., a live operator, other automated service, etc. If the caller is a subscriber, then the SCP 23 retrieves a record associated with the subscriber from a database and instructs the SSP 24 to play an announcement to the subscriber. Alternatively, but not necessarily, the SCP 23 may instruct the SSP 24 to forward the caller to an IP 74 that will present an announcement to the subscriber. The record associated with the subscriber is based upon a subscriber's preferences, as will be discussed later. The announcement includes a prompt requesting that the subscriber select from a menu of options. As will be discussed, the specific menu of options is determined by the subscriber.

After the caller responds to the prompt, via spoken word or keypad entry, the SSP 24 (or IP) collects the response entered by the subscriber and transmits it to the SCP 23. Then, the SCP 23 collects the response and performs a look up in a database (or table) to determine how to route the call based upon the subscriber's selection. In one example, depending on the subscriber's selection, the SCP 23 may retrieve a toll free number to route the call to an automated service capable of managing a collect call or calling card call. Further, the SCP 23 may retrieve a routing number to send the call to directory assistance, or to transfer the call to a live operator. In sum, the SCP 23 sends a call routing instruction message to the SSP 24, which routes the call. In this regard, the call may be routed through the terminating SSP 21 depending upon the central office handling the call.

Figure 12:
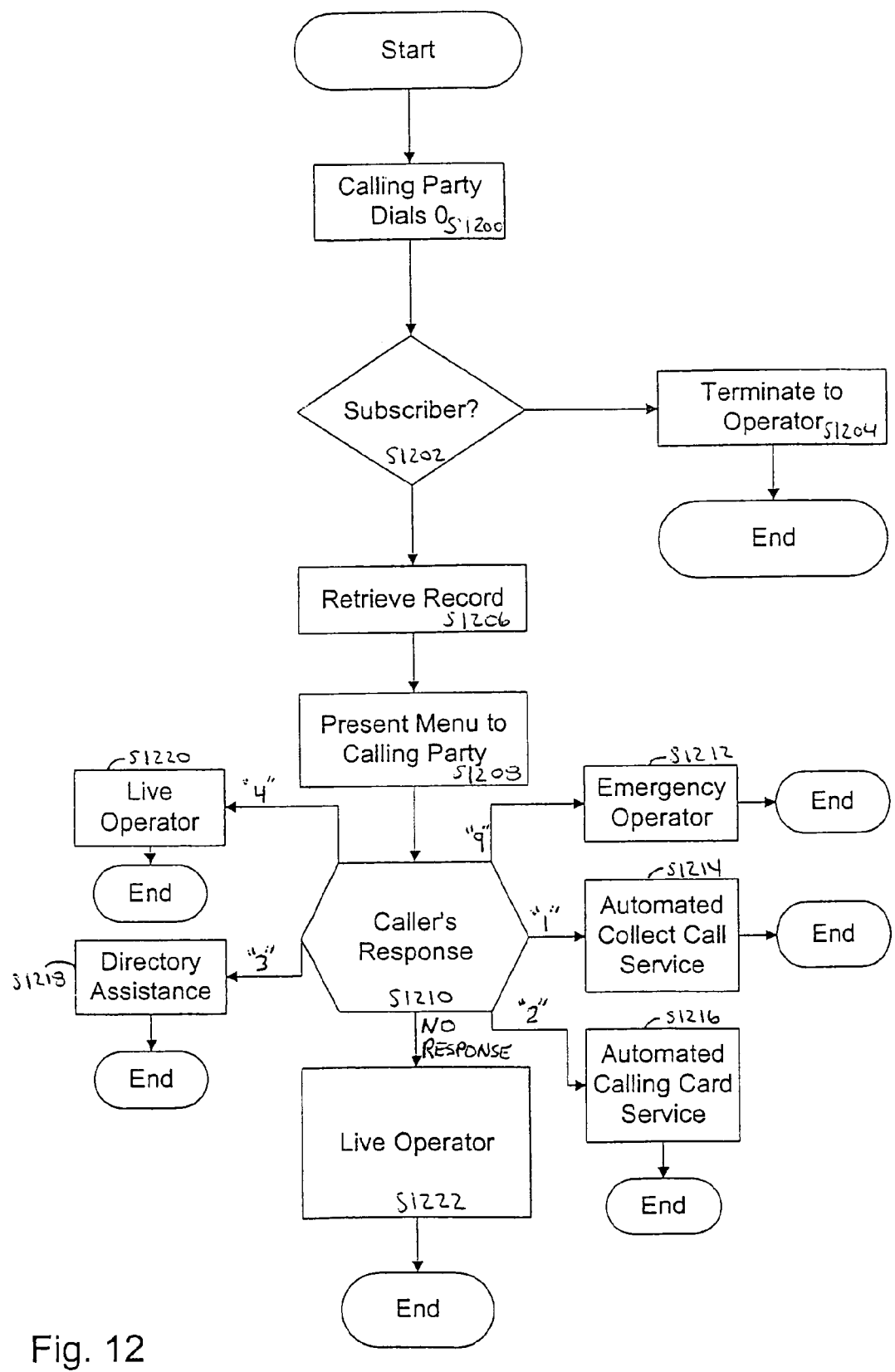
FIG. 12 is an exemplary flow diagram of the custom operator service, according to an aspect of the present invention.

FIG. 12 is an exemplary flow diagram of the custom operator service, according to an aspect of the present invention. At step s1200, the calling party goes off hook and dials "0" to reach operator assistance. At step s1202, a determination is made as to whether the caller is a subscriber to the custom operator service. If the caller is not a subscriber to the custom operator service, then the call is routed in a conventional manner at step s1204, e.g., a live operator, other automated service, etc. Otherwise, if the caller is determined to be a subscriber at step s1202, then a record associated with the subscriber is retrieved at step S1206.

After the record associated with the subscriber is retrieved at step s1206, the caller is prompted at step s1208 with a menu. An exemplary menu may be presented as follows: "Press or say "9" for fire, police, rescue or emergency services; Press or say "1" to place a collect call; press or say "2" to place a calling card call; press or say "3" for directory assistance; press or say "4" to speak to an operator." The caller's response, if any, is received at step s1210. If the caller selects "9", then the call is transferred to an emergency services center (e.g., the SSP 24 routes the call to a 911 tandem switch that routes the call to the appropriate emergency services center based on the calling party number) at step s1212. If the caller selects "1", then the SSP 24 forwards the call to an appropriate toll free number of an automated service to handle the placement of the collect call at step s1214. If the caller selects "2", then the SSP 24 forwards the call to an appropriate toll free number of an automated service to handle the placement of the calling card call at step s1216. If the caller selects "3", then the SSP 24 transfers the call to directory assistance at step s1218. If the calling party selects "4", then the SSP 24 transfers the call to a live operator at step s1220. If the caller makes no selection for a predetermined amount of time (e.g., seven seconds), then the call is transferred to a live operator at step s1222. That is, the call is transferred to a live operator if the caller selects "4" or if the caller makes no selection after the predetermined time has elapsed.

Figure 13:
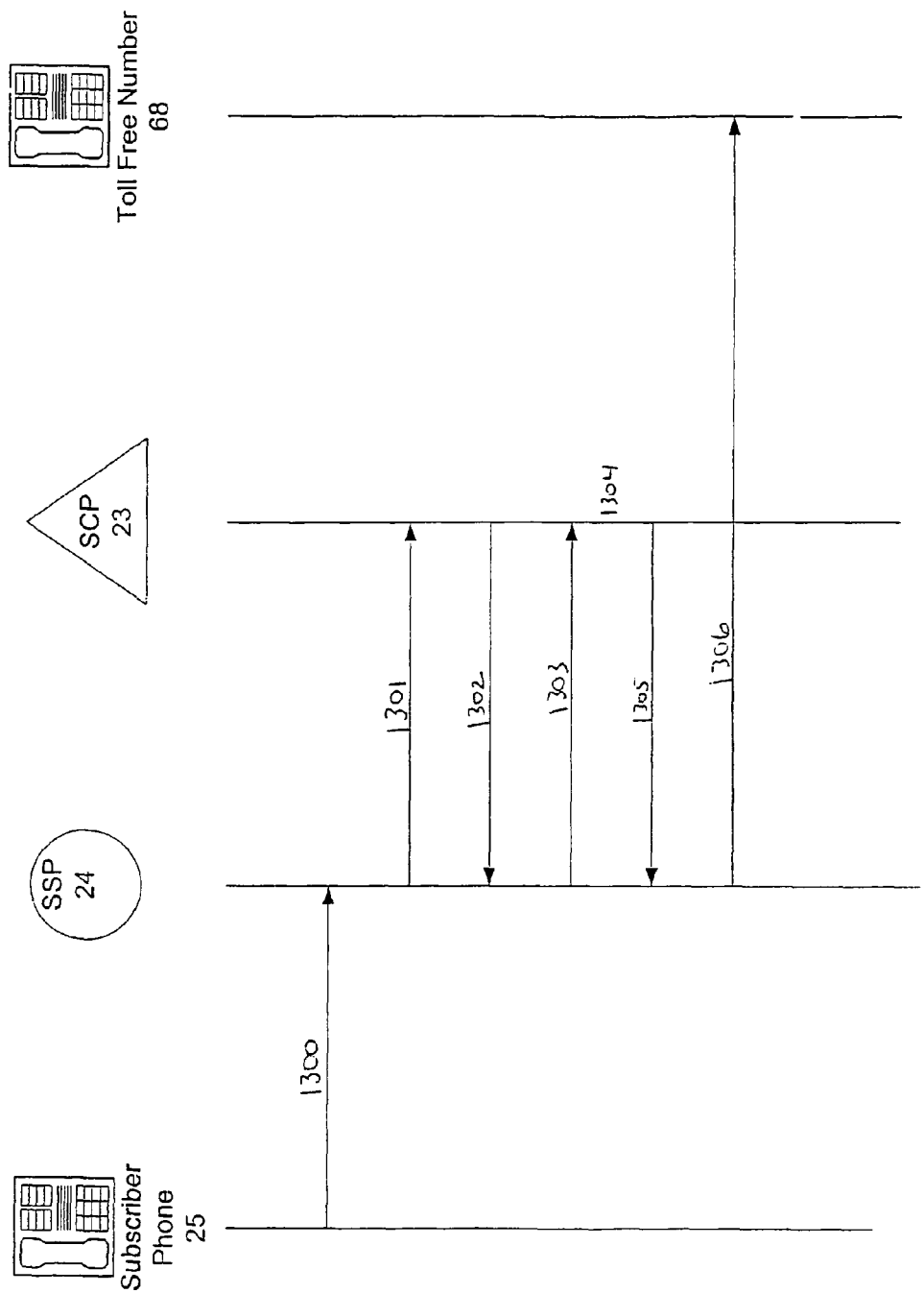
FIG. 13 is an exemplary call flow diagram of a call routed in accordance with the custom operator service, according to an aspect of the present invention.

FIG. 13 is an exemplary call flow diagram of a call routed in accordance with the custom operator service, according to an aspect of the present invention. Calls made by subscribers to operator assistance by dialing "0" encounter an OST at the subscriber's SSP 24 at step 1300. The SSP 24 sends an AIN query (e.g., an info_analyzed query) to the SCP 23 to determine if the caller is a subscriber to custom operator services at step 1301. The AIN query includes at least the telephone number of the calling party. If the SCP 23 determines via a database look up (using the calling party number, for instance) that the caller is a subscriber to custom operator services, then the SCP 23 retrieves a record, from an AIN database, associated with the subscriber. The record retrieved by the SCP 23 is based on the subscriber's operator services preferences, as will be discussed later.

At step 1302, the SCP 23 sends a response to the SSP 24 (e.g., a send_to_resource message) with a unique subscriber identifier, instructing the SSP 24 to play an announcement to the subscriber associated with the subscriber's record. Alternatively, the SSP 24 may forward the SCP instruction to the IP 74 that will present an announcement to the subscriber. The announcement includes a menu of messages from which the subscriber is prompted to select.

Once the subscriber has selected an option from the menu, the SSP 24 collects the response and forwards the response to the SCP 23 at step 1303. The SCP 23 receives the response and performs a look up in a table or database to determine how to route the call based upon the subscriber's selection at step 1304. At step 1305, the SCP 23 sends a message to the SSP 24 (e.g., an analyze_route response) that instructs the SSP 24 as to how the call is to be routed. At step 1306, the SSP 24 routes the call based upon the instructions sent by the SCP 23. In the exemplary illustration, the call has been routed to an appropriate toll free number 68. For example, the toll free number may be of an automated service to handle the placement of a collect calls or calling card calls. It is noted that calling card calls includes not only calling cards, but credit card calls as well. In another scenario, routing may be directed to emergency services or directory assistance in a similar fashion. For example if the caller had chosen directory assistance, then the call would have been routed to automated directory assistance at step 1306 in a known manner.

Figure 14:
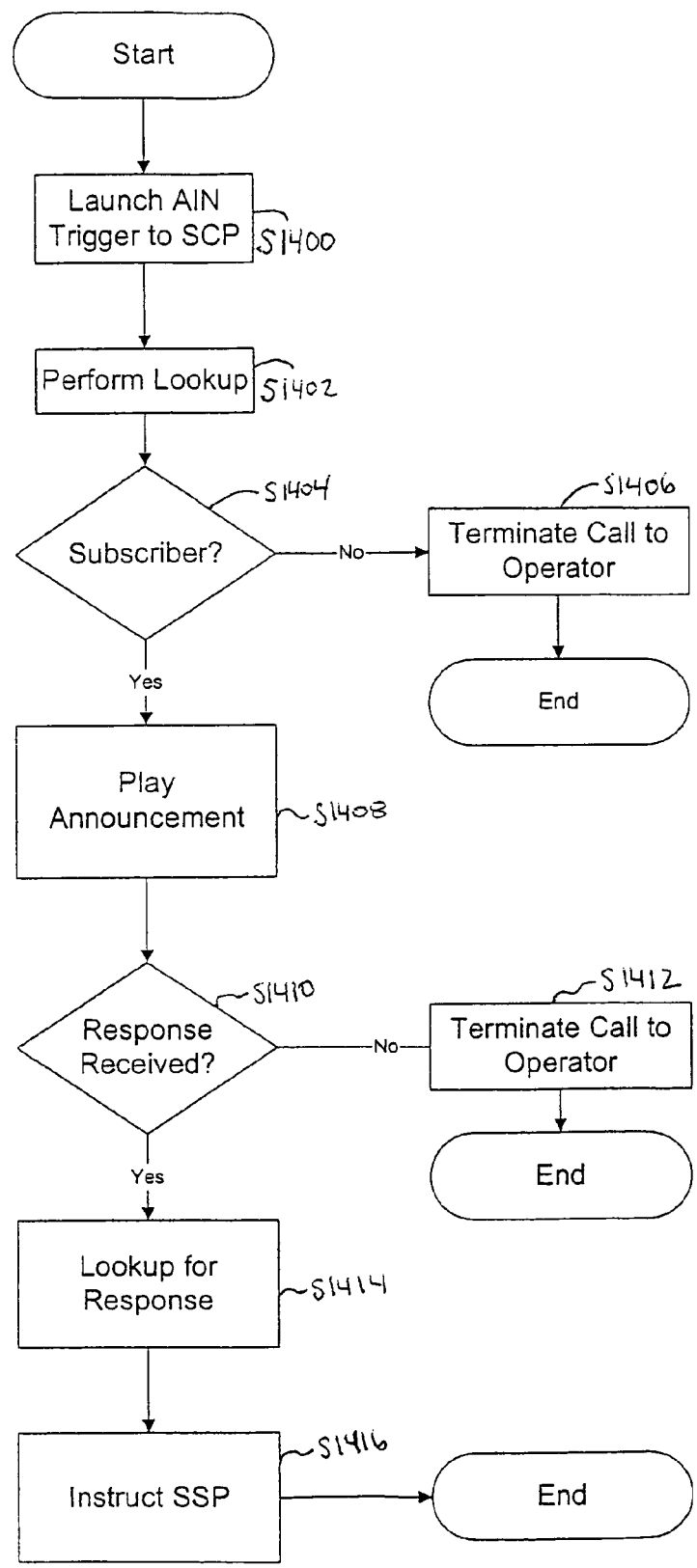
FIG. 14 is an exemplary flow diagram depicting service logic of the automated operator service, according to an aspect of the present.

FIG. 14 is an exemplary flow diagram depicting service logic of the automated operator service, according to an aspect of the present. At step s1400, the SSP 24 launches a query to the SCP 23, in response to a call placed by dialing "0". The SCP 23 performs a look up at step s1402 to determine whether the caller is a subscriber to the custom operator service. If it is determined at step s1404 that the caller is not a subscriber, then the SCP 23 instructs the SSP 24 to route the call in a conventional manner at step s1406, e.g., a live operator, other automated service, etc. If it is determined at step s1404 that the caller is a subscriber, then the SCP 23 instructs the SSP 24 to play an announcement to the caller at step s1408. Alternatively, the SSP 24 may forward the SCP instruction to the IP 74 that will present an announcement to the subscriber. The announcement includes a prompt requesting that the subscriber select from a menu of options. As alluded to previously, the specific menu of options is determined by the subscriber as will be discussed later.

At step s1410 a determination is made as to whether the SSP 24 (or IP 74) has forwarded the caller's selection to the SCP 23. If after a predetermined time (e.g., 7 seconds) no selection has been received by the caller, then the SCP 23 instructs the SSP 24 to route the call to operator services (e.g., a live operator at step s1412). If the SCP 23 has received the caller's selection from the SSP 24 (or IP 74), then a look up is performed at the SCP 23 to determine how to route the call based upon the caller's selection at step s1414. At step s1416, the SCP 23 provides instructions to the SSP 24 as to the routing of the call.

As mentioned, the subscriber may configure (i.e., pre-program) operator services preferences on the subscriber's line that will be presented upon dialing "0" for operator assistance. That is, the subscriber may use the Internet or IVR to identify which of a group of available options will be presented to the subscriber upon dialing "0" for operator assistance. Furthermore, the subscriber may determine which keypad number is associated with each menu option.

Figure 15:
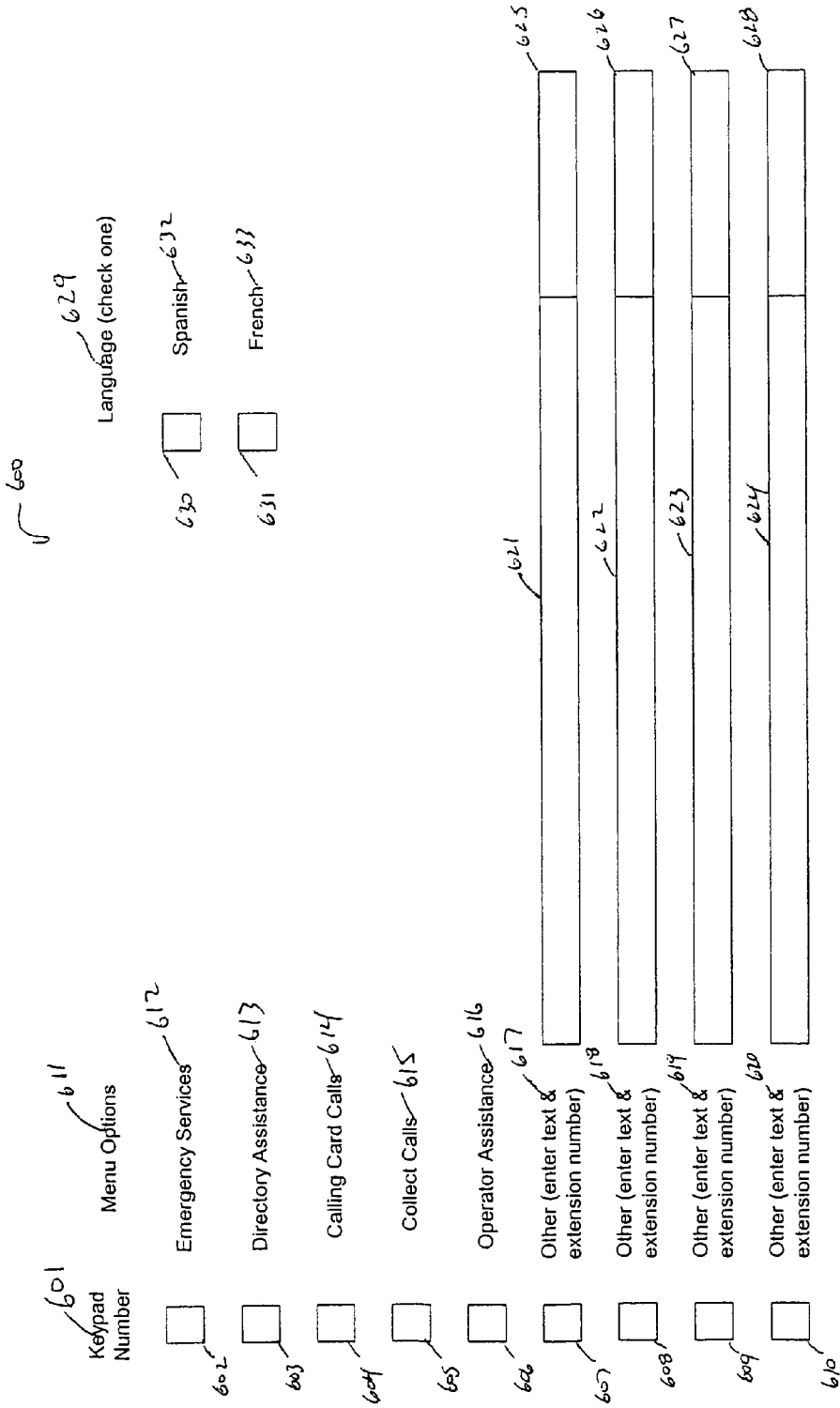
FIG. 15 is an exemplary custom operator service preferences web page, according to an aspect of the present invention.

FIG. 15 is an exemplary custom operator service preferences web page, according to an aspect of the present invention. To access the operator service preferences web page via PCM, the user would generally perform the procedure and process as explained with respect to FIGS. 4, 5, and 6. A PCM summary display (similar to the one shown in FIG. 7) with appropriate display box is also provided in order to access the operator service preferences web page.

Referring again to FIG. 15, the web page includes an interface 600, a keypad number column 601, keypad number boxes 602-610, a menu options column 611, option indicators 612-620, text boxes 621-624, directory number boxes 625-628; a language column 629, language boxes 630, 631, and language indicators 632, 633. Each of the keypad number boxes 602-610 correspond to one adjacent option indicator 612-620.

Menu options column 611 includes the list of available options to subscribers of the custom operator service, i.e., emergency services 612, directory assistance 613, calling card calls 614, collect calls 615, and live operator 616. Using keypad number boxes 602-610 and corresponding option indicators 612-620, a subscriber may pre-program what menu options will be presented and in what order. For example, by entering "9" in keypad number box 602, "2" in keypad number box 605, "3" in keypad number box 604, "4" in keypad number box 603, and "5" in keypad number box 606 the subscriber's menu will be presented as follows: Press or say "9" for fire, police, rescue or emergency services; press or say "2" to place a collect call; press or say "3" to place a calling card call; press of say "4" for directory assistance; press or say "5" to speak to an operator.

Of course, the subscriber may include as many or few options as desired. As a result, the subscriber may pre-program the operator service features that the subscriber is most likely to use. That is, if the subscriber is not likely to place calling card calls, then that option would likely not be included in the menu of choices. On the other hand, if the subscriber is likely to place a large number of calls to directory assistance, then that menu option would likely be positioned near the beginning of the menu of choices (i.e., "1" or "2"). Thus, the subscriber would not have to listen to multiple menu options before receiving the one that they would be most likely to choose. In one embodiment, the option for emergency services will be presented first to callers, no matter which number the caller assigns to that option.

Alternatively, the subscriber may pre-program their operator service such that all calls placed to "0" are, for instance, automatically transferred to a toll free number to handle the placement of a calling card call. This may be accomplished, for example, by entering "0" in keypad number box 604. Thus, when the SCP 23 retrieves the subscriber's preferences, it would instruct the SSP 24 to route the call to an automated service, for instance, to handle the calling card call.

The subscriber may also designate the language in which the menu options will be presented, e.g., Spanish, French, etc. This may be accomplished by clicking in one of language boxes 630 or 631. As a result, when the SCP 23 retrieves the subscriber's preferences, it would instruct the SSP 24 (or IP 74) to present menu options in the subscriber's designated language.

By entering a keypad number in keypad number boxes 607, 608, 609, or 610, an administrator of a subscriber network (e.g., Centrex) may include routing options for the routing of calls to destinations within the subscriber network, as well as outside of the subscriber network. Specifically, the administrator may enter the text of their menu options in text boxes 621-624 and corresponding directory numbers (e.g., ten digit numbers) in directory number boxes 625-628. Despite the fact that multiple text boxes have been depicted, an administrator may enter text into as many text boxes 621-624 as desired with corresponding directory numbers in boxes 625-628. Alternatively, no entries may be made in text boxes 621-624 and directory number boxes 625-628. The text of their menu options is entered in text boxes 621-624. Thereafter, the SMS 48 sends the information to the SCP 23 where the text is stored in a database. Alternatively, the text may be stored in the IP 74. Thus, the SCP 23 would instruct the IP 74 to convert the text to speech using a known text to speech converter, which presents the menu options to the subscriber.

Referring to FIG. 10, the subscriber may interactively configure their operator service preferences by either of two methods—via a telecommunications device or Internet client. First, the subscriber may dial a toll-free number, e.g., an 800 number or local number, to access the IVR or other prompting system with access to the SMS 48. The subscriber may, additionally, access the operator services system via the Internet using a network access system such as a web client 30.

Via IVR, the subscriber phone 25 is used to dial the number of operator services. The SSP 24 then routes the call to the IVR 45 that communicates with the SMS 48 and the subscriber is authenticated as previously discussed. The IVR 45 then executes dialog with the subscriber to record the subscriber's preferences. The subscriber provides requested information by (e.g., recording menu messages or providing requested information) and/or pressing keypad buttons. The SMS 48 then stores collected information in a local database and may notify the SCP 23. The SCP 23 then stores the information in its database. Specifically, keypad entries may be stored in the SCP 23 and recorded messages may be stored in the IP 74.

By responding to the IVR prompts, the subscriber (or administrator) may perform all of the same programming functions described with respect to FIG. 15. The subscriber may respond to the IVR prompts by spoken word or keypad entry. Additionally, using the IVR, the subscriber may record their own menu messages so that the subscriber would hear their own voice presenting the menu messages, in a language of choice. In this scenario, the messages recorded by the subscriber are stored in IP 74. Then, the SCP 23 would instruct the IP 74 to present menu options using the recorded and stored messages.

Via PCM, the subscriber uses the web client 30 to navigate to the custom operator services configuration page where the web server 54 authenticates the subscriber as previously discussed. The web server 54 displays the web page and the subscriber provides the requested information using the web client 30. The web server 54 subsequently forwards the information to the SMS 48, which stores the collected information in a local database and notifies the SCP 23 of the subscriber interaction. The SCP 23 then stores the information in its database.

The web server 54 provides a web interface to the SMS 48 so that subscribers can configure their operator services through the web rather than through an IVR. The web client 30 (e.g., Netscape Navigator or Microsoft Internet Explorer) is used by a subscriber to access custom operator service web pages.

Figure 16:
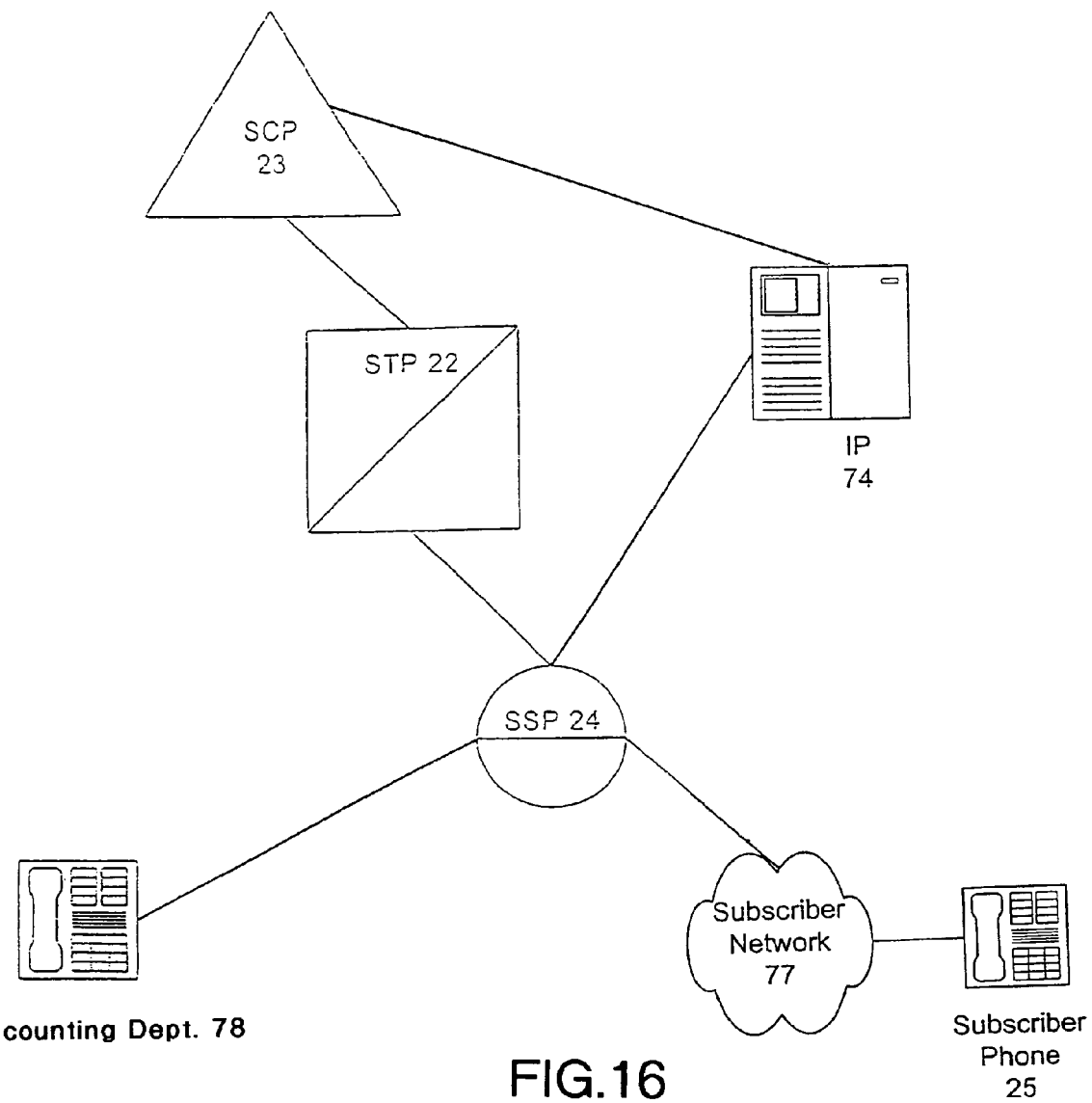
FIG. 16 is an exemplary telecommunication network, according to an aspect of the present invention.

FIG. 16 shows an exemplary telecommunications network, according to an aspect of the present invention. As illustrated, the operator service may be employed with a subscriber network 77, e.g., Centrex group, PBX, etc. When a member of subscriber network dials "0" using the subscriber phone 25, the call is suspended at the SSP 24 by virtue of an OST in the switch. It is understood that in some instances, the member may first have to dial another digit (e.g., "9") to access an outside line. The trigger also causes the SSP 24 to transmit an AIN query message including at least the calling party number via the SS7 network and the STP 22 to the SCP 23. The SCP 23 performs a look up in a database to determine if the caller is a subscriber to the custom operator service. If the caller is not a subscriber, then the call is routed in a conventional manner, e.g., a live operator, other automated service, etc. If the caller is a subscriber, then the SCP 23 retrieves a record associated with the subscriber and instructs the SSP 24 to play an announcement to the subscriber. Alternatively, but not necessarily, the SCP 23 may instruct the SSP 24 to forward the caller to IP 74 that will present an announcement to the subscriber, The announcement includes a prompt requesting that the subscriber select from a menu of options, the menu of options having previously been determined by the subscriber. The SSP 24 (or IP 74) collects the response entered by the subscriber and forwards it to the SCP 23. Then, the SCP 23 collects the response and performs a look up in a database (or table) to determine how to route the call based upon the subscriber's selection. As a result, the SCP 23 sends a call routing instruction message to the SSP 24, which routes the call.

The SSP 24 may route the call to extensions within the subscriber network, such as the Accounting Department 78, using the extension number provided by an administrator during provisioning of the operator services (as discussed with respect to FIG. 15). That is, in addition to routing the calls to locations outside of the subscriber network, such as directory assistance or a live operator, the calls may be routed to extensions within the company, e.g., corporate directory assistance, accounting department, cafeteria, etc. For example, upon dialing "0" a Centrex group member may be provided with a menu as follows: Press or say "1" for emergency services (i.e., 911); press or say "2" for directory assistance; press or say "3" for corporate directory assistance; press or say "4" for the accounting department; press or say "5" for the receptionist; press or say "6" to speak to an operator.

Figure 17:
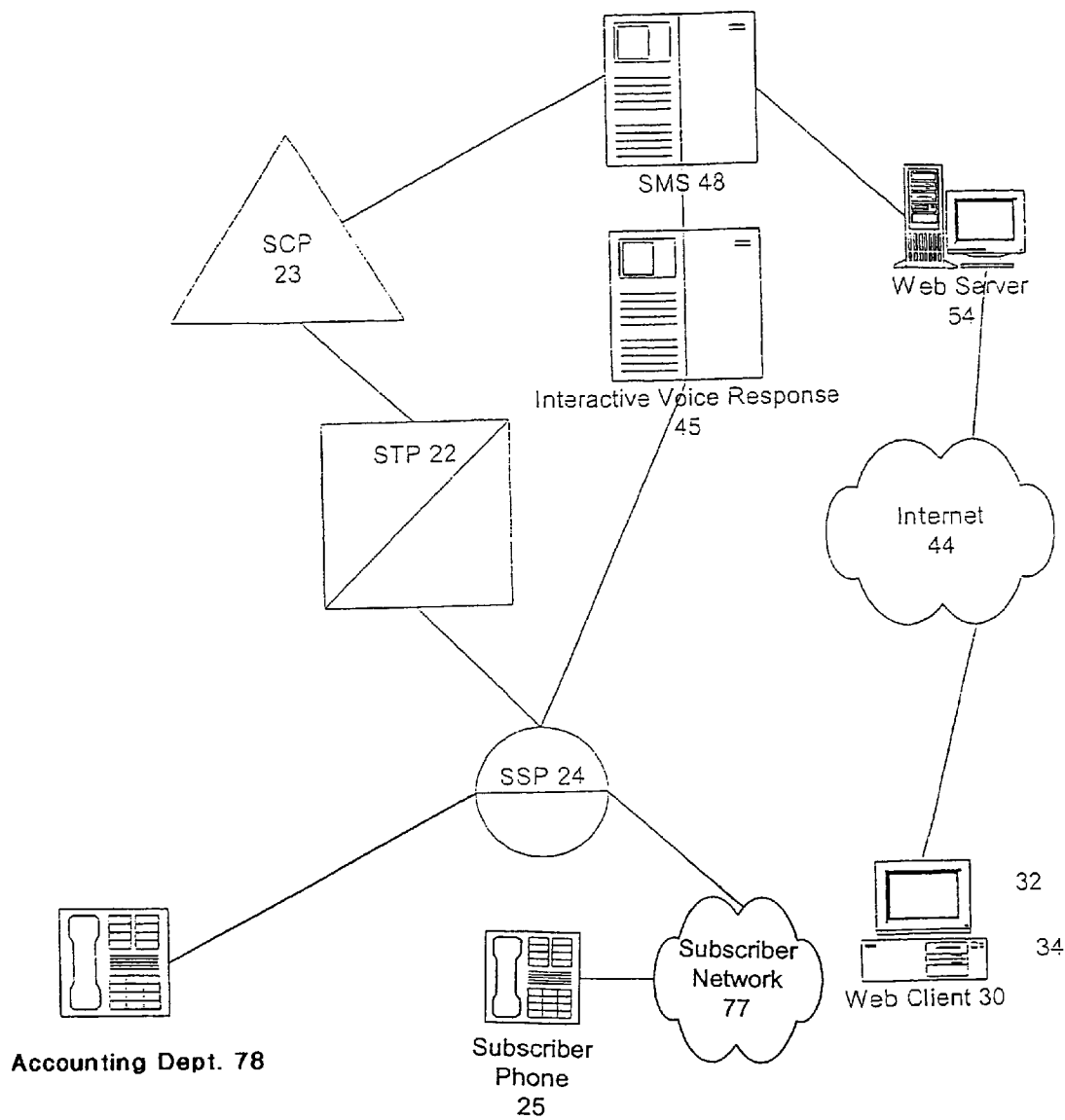
FIG. 17 is an exemplary telecommunications network, according to an aspect of the present invention.

The pre-programming of subscriber preferences in the context of subscriber network 77 will now be discussed with respect to FIG. 17. This function may likely be performed by an administrator, but may be performed by as many persons that have authorization to do so. FIG. 17 is an exemplary telecommunications network, according to an aspect of the present invention. Using an IVR, the subscriber phone 25 is used to dial the number of operator services. The SSP 21 then routes the call to the IVR 45 that communicates with the SMS 48 and the subscriber is authenticated as previously discussed. The IVR 45 then executes dialog with the subscriber to record the administrator's preferences. The subscriber provides requested information by (e.g., recording menu messages or providing requested information) and/or pressing keypad buttons. The SMS 48 then stores collected information in a local database and notifies the SCP 23. The SCP 23 then stores the information in its database.

Otherwise an administrator may use PCM via the web client 30 to navigate to the custom operator service configuration page where the web server 54 authenticates the subscriber as previously discussed. The web client 30 may or may not be connected directly to subscriber network 77. The web server 54 displays the web page and the subscriber provides the requested information using the web client 30. The web server 54 subsequently forwards the information to the SMS 48, which stores the collected information in a local database and notifies the SCP 23 of the subscriber interaction. The SCP 23 then stores the information in its database.

Referring to FIG. 15, the administrator may enter the text of an "other" menu options in text boxes 621-624 and corresponding directory numbers in directory number boxes 625-628. Thereafter, the SMS 48 sends the information to the SCP 23 where the text is stored in a database. Alternatively, the text may be stored in the IP 74. Thus, the SCP 23 would instruct the IP 74 to convert the text to speech using a known text to speech converter, which presents the menu options to the subscriber.

Although the custom operator service has been previously described using an SMS, an AIN IP 40 incorporating an IVR 45 and a service status database 41 (as shown in FIG. 1) may be provided in lieu of the SMS 48. With the service implemented, the IP 40 functions in a similar manner as described with respect to the SMS 48.

Thus, subscribers to the custom operator service may tailor their operator service to best meet their needs. Further, members of a subscriber network may take advantage of the automated features of the custom operator service.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, HTML, HTTP, LDAP, SHTML, DHTML, XML, PPP, FTP, SMTP, MIME) and public telephone networks (ISDN, ATM, xDSL, GR-1129, GR-1298, GR-1299, SR-3389, SR-3511) represent examples of the state of the art. Such standards are periodically superseded by faster or more efficient equivalents having essentially the same functions. Accordingly, replacement standards and protocols having the same functions are considered equivalents

What is claimed is:

1. A non-transitory computer readable medium storing a program of encoded computer executable instructions for configuring preferences of a user that determine processing of calls placed from a caller of a subscriber network to operator assistance, comprising:

an authenticating code segment that authenticates the user;
a first displaying code segment that displays a first input area for the user to enter a plurality of keypad numbers;
a second displaying code segment that displays a second input area for the user to enter text comprising a plurality of menu options, each menu option corresponding to a respective one of the entered keypad numbers;
a third displaying code segment that displays a third input area for the user to enter a plurality of routing numbers, each routing number corresponding to a respective one of the entered keypad numbers, at least one of the entered routing numbers comprising a directory number outside of the subscriber network and at least one of the entered routing numbers comprising an extension within the subscriber network; and
a receiving code segment that receives the plurality of keypad numbers, the text, and the plurality of routing numbers entered by the user for the processing of calls placed from the caller of the subscriber network to operator assistance,
wherein a menu associated with the plurality of keypad numbers and the text entered by the user is presented to the caller when the caller places a call to operator assistance, and
wherein a menu selection of one of the keypad numbers by the caller causes the call to be routed from operator assistance to the routing number corresponding to the selected keypad number.

2. The non-transitory computer readable medium of claim 1, further comprising a storing code segment that stores the plurality of keypad numbers, the text, and the plurality of routing numbers entered by the user, in an intelligent peripheral.

3. The non-transitory computer readable medium of claim 1, wherein the plurality of keypad numbers, the text, and the plurality of routing numbers entered by the user, are received from an Internet client.

4. The non-transitory computer readable medium of claim 1, further comprising a storing code segment that stores the plurality of keypad numbers, the text, and the plurality of routing numbers entered by the user, at a service control point.

5. The non-transitory computer readable medium of claim 1, wherein the subscriber network comprises a centrex group.

6. The non-transitory computer readable medium of claim 1, wherein the subscriber network comprises a private branch exchange (PBX).

7. The non-transitory computer readable medium of claim 1, further comprising a converting code segment that converts the text entered by the user into speech.

8. The non-transitory computer readable medium of claim 7, wherein the text converted to speech is presented to the caller in the menu.

9. The non-transitory computer readable medium of claim 1, wherein the directory number comprises a ten digit number.

10. The non-transitory computer readable medium of claim 1, wherein the at least one displaying code segment displays a fourth input area for the user to designate a language for the menu.

11. A method for configuring preferences of a user that determine processing of calls placed from a caller of a subscriber network to operator assistance, comprising:
authenticating the user;

displaying a first input area for the user to enter a plurality of keypad numbers;

displaying a second input area for the user to enter text comprising a plurality of menu options, each menu option corresponding to a respective one of the entered keypad numbers;

displaying a third input area for the user to enter a plurality of routing numbers, each routing number corresponding to a respective one of the entered keypad numbers, at least one of the entered routing numbers comprising a directory number outside of the subscriber network and at least one of the entered routing numbers comprising an extension within the subscriber network; and receiving and storing the plurality of keypad numbers, the text, and the plurality of routing numbers entered by the user for the processing of calls placed from the caller of the subscriber network to operator assistance, wherein a menu associated with the plurality of keypad numbers and the text entered by the user is presented to the caller when the caller places a call to operator assistance, and wherein a menu selection of one of the keypad numbers by the caller causes the call to be routed from operator assistance to the routing number corresponding to the selected keypad number.

12. The method of claim 11, wherein the plurality of keypad numbers, the text, and the plurality of routing numbers entered by the user, are stored in an intelligent peripheral.

13. The method of claim 11, wherein the plurality of keypad numbers, the text, and the plurality of routing numbers entered by the user, are received from an Internet client.

14. The method of claim 11, wherein the plurality of keypad numbers, the text, and the plurality of routing numbers entered by the user, are stored at a service control point.

15. The method of claim 11, wherein the subscriber network comprises a centrex group.

16. The method of claim 11, wherein the subscriber network comprises a private branch exchange (PBX).

17. The method of claim 11, further comprising converting the text entered by the user into speech.

18. The method of claim 17, wherein the text converted to speech is presented to the caller in the menu.

19. The method of claim 11, wherein the at least one directory number comprises a ten digit number.

20. The method of claim 11, further comprising displaying a fourth input area for the user to designate a language for the menu.

* * * * *